United States Patent
Park et al.

(10) Patent No.: US 9,997,813 B2
(45) Date of Patent: Jun. 12, 2018

(54) LITHIUM AIR BATTERY

(71) Applicant: SK INNOVATION CO., LTD., Seoul (KR)

(72) Inventors: Myoung Gu Park, Daejeon (KR); Kyong Sik Kim, Daejeon (KR); Seong Ho Chun, Daejeon (KR); Hee Young Sun, Daejeon (KR); Suk Chin Lee, Daejeon (KR); Jung Moon Sung, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 119 days.

(21) Appl. No.: 14/182,560

(22) Filed: Feb. 18, 2014

(65) Prior Publication Data

US 2015/0236388 A1    Aug. 20, 2015

(51) Int. Cl.
| | |
|---|---|
| *H01M 12/08* | (2006.01) |
| *H01M 2/02* | (2006.01) |
| *H01M 4/86* | (2006.01) |
| *H01M 8/0239* | (2016.01) |
| *H01M 8/0245* | (2016.01) |
| *H01M 4/88* | (2006.01) |

(52) U.S. Cl.
CPC ......... *H01M 12/08* (2013.01); *H01M 2/0255* (2013.01); *H01M 4/8605* (2013.01); *H01M 8/0239* (2013.01); *H01M 8/0245* (2013.01); *H01M 4/8875* (2013.01); *H01M 2300/0094* (2013.01); *Y02E 60/128* (2013.01)

(58) Field of Classification Search
CPC ... H01M 12/08; H01M 2/0255; H01M 8/1004
USPC .......................................................... 429/405
See application file for complete search history.

(56) References Cited

U.S. PATENT DOCUMENTS

| | | | | |
|---|---|---|---|---|
| 6,158,537 A | * | 12/2000 | Nonobe | ............... B60L 11/1851 180/65.1 |
| 2011/0027642 A1 | * | 2/2011 | Lee | ..................... B01D 67/0079 429/145 |
| 2012/0028164 A1 | | 2/2012 | Lee et al. | |
| 2012/0171594 A1 | * | 7/2012 | Mizuno et al. | ............... 429/480 |

(Continued)

FOREIGN PATENT DOCUMENTS

| | | |
|---|---|---|
| JP | 2007524204 | 8/2007 |
| KR | 1020120011322 | 2/2012 |

(Continued)

OTHER PUBLICATIONS

STIC Search by C. Li.*

*Primary Examiner* — Miriam Stagg
*Assistant Examiner* — Victoria H Lynch
(74) *Attorney, Agent, or Firm* — IP & T Group LLP

(57) ABSTRACT

Provided is a lithium air battery in which a catalyst layer of a cathode contacting an electrolyte and using oxygen in the air as an active material is coupled to a membrane through which lithium ions pass, such that even though charge and discharge of the battery is repeated, the catalyst layer may not be detached, and a microporous polyolefin-based film is applied to the battery, such that a water-based electrolyte solvent may be prevented from being evaporated, thereby preventing performance deterioration due to repetition of the charge and discharge of the lithium air battery, and extending life span.

6 Claims, 16 Drawing Sheets

(56) References Cited

U.S. PATENT DOCUMENTS

2013/0183591 A1* 7/2013 Dickson .............. H01M 2/0255
                                                                                 429/405
2013/0273442 A1* 10/2013 Ogumi ................ H01M 4/9016
                                                                                 429/405

FOREIGN PATENT DOCUMENTS

| KR | 1020120063163 | 6/2012 |
|----|---------------|--------|
| WO | 2005083829    | 9/2005 |

* cited by examiner

LITHIUM AIR BATTERY

TECHNICAL FIELD

The present invention relates to a lithium air battery, and more specifically, to a lithium air battery capable of preventing performance deterioration due to repetition of charge and discharge of the battery and extending life span.

BACKGROUND

Recently, in accordance with an increase in carbon dioxide emission due to consumption of fossil fuel, a rapid change of crude oil price, and the like, development of a technology of converting from gasoline and diesel oil to an electric energy as an energy source of automobile has been spotlighted. Commercialization of an electric automobile has progressed, and for a long-distance driving, a lithium ion battery which is a storage battery has been required to have large capacitance and high energy densification. However, the current lithium ion battery has a limitation in battery capacitance, thereby having difficulty in a long distance driving. Therefore, a lithium air battery having larger capacitance and higher energy density in theory as compared to the lithium ion battery has been spotlighted.

In general, the lithium air battery includes an anode capable of adsorbing and emitting lithium ion, a cathode including an oxidation-reduction catalyst of oxygen using oxygen in the air as a cathode active material, wherein a lithium ion conductive medium is provided between the cathode and the anode. That is, the lithium air battery, which is a battery having the cathode using oxygen in the air as the active material, is a battery capable of charging and discharging the battery by performing an oxidation-reduction reaction of oxygen in the cathode.

The lithium air battery has a theoretical energy density of 3000 Wh/kg or more, which corresponds to an energy density approximately 10 times larger than that of the lithium ion battery. In addition, the lithium air battery is environment-friendly and may provide more improved stability than that of the lithium ion battery.

However, in the existing lithium air battery, due to repetition of charge and discharge of the battery, a catalyst layer of the cathode is detached and a water-based electrolyte solvent used between a solid electrolyte and porous air-cathode is evaporated, such that performance of the lithium air battery may be deteriorated and life span may be reduced.

As the related art document regarding the above-description, US Patent Application Publication No. 2012/0028164 entitled "lithium air battery" is disclosed.

RELATED ART DOCUMENT (Patent Document 1) US Patent Application Publication No. 2012/0028164 A1 (Feb. 2, 2012)

SUMMARY

An embodiment of the present invention is directed to providing a lithium air battery capable of not detaching a catalyst layer configuring a cathode thereof but preventing a water-based electrolyte solvent from being evaporated, thereby improving durability, preventing performance deterioration, and extending life span.

In one general aspect, a lithium air battery includes: a first electrode part including a lithium metal; a second electrode part including a gas diffusion layer of which one side contacts an air, a catalyst layer formed at the other side of the gas diffusion layer, and a membrane coupled to the catalyst layer so that lithium ions pass therethrough, and spaced apart from the first electrode part; and an electrolyte part provided between the first electrode part and the second electrode part.

The electrolyte part may include a separator closely adhered on one side of the first electrode part and containing an organic-based electrolyte, a solid electrolyte closely adhered on one side of the separator, and a water-based electrolyte provided between the solid electrolyte and the second electrode part.

The second electrode part may further include a microporous polyolefin-based film coupled on one side of the gas diffusion layer.

The lithium air battery may further include: a housing part including a first housing provided with a space part having an open upper side, and a second housing having an air accommodation part disposed at an upper portion of the first housing, sealing the space part of the first housing, and having an open lower side, and ventilation holes formed therein to communicate with the air accommodation part, wherein the first electrode part is accommodated into the space part of the first housing, the second electrode part is coupled to a lower side of the air accommodation part of the second housing to be spaced apart from the first electrode part and has the gas diffusion layer disposed on an upper side thereof and the membrane disposed on a lower side thereof, and the electrolyte part is provided in the space part of the first housing to be provided between the first electrode part and the second electrode part.

The electrolyte part may include a separator closely adhered on an upper side of the first electrode part and containing an organic-based electrolyte, a solid electrolyte closely adhered on an upper side of the separator, a water-based electrolyte provided between the solid electrolyte and the second electrode part, and an accommodation body provided on an upper side of the solid electrolyte and having an accommodation hole vertically penetrating therethrough, and the accommodation body may be disposed so that the solid electrolyte, the separator, and the first electrode part are closely adhered to the space part.

The housing part may further include a third housing interposed between the first housing and the second housing and having a fixing hole vertically penetrating therethrough so that the second electrode part is fixed to the fixing hole.

The membrane may be a porous membrane containing a sulfonic acid group.

The membrane may be made of a polyperfluorosulfonic acid (PFSA) resin having a porous material.

The membrane may be closely adhered to the catalyst layer by heating and pressing the PFSA resin or by a dip-coating method using a PFSA resin solution.

BRIEF DESCRIPTION OF THE DRAWINGS

The present invention relates to a lithium air battery in which a catalyst layer of a cathode contacting an electrolyte and using oxygen in the air as an active material is coupled to the membrane through which the lithium ions pass, such that even though charge and discharge of the battery is repeated, the catalyst layer may not be detached, and microporous polyolefin-based film is applied to the battery, such that a water-based electrolyte solvent may be prevented from being evaporated, thereby preventing performance deterioration due to repetition of the charge and discharge of the lithium air battery, and extending life span.

[Detailed Description of Main Elements]

1000: Lithium Air Battery
100: Housing Part

[Detailed Description of Main Elements]

110: First Housing
111: Space Part
112: Coupling Hole
120: Second Housing
121: Ventilation Hole
122: Air Accommodation Part
127: First Fixing Part
128: First Coupling Part
130: Third Housing
131: Fixing Hole
132: Second Fixing Part
133: Second Coupling Part
134: Through Hole
200: First Electrode Part
210: Lithium Metal
220: Current Collector
300: Second Electrode Part
311: Gas Diffusion Layer
312: Catalyst Layer
313: Membrane
314: Microporous Polyolefin-based Film
400: Electrolyte Part
410: Separator (Organic-based Electrolyte)
420: Solid Electrolyte
430: Accommodation Body
431: Accommodation Hole
440: First Sealing Part
450: Water-based Electrolyte

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a lithium air battery according to the present invention will be described in detail with reference to the accompanying drawings.

Figure 1:
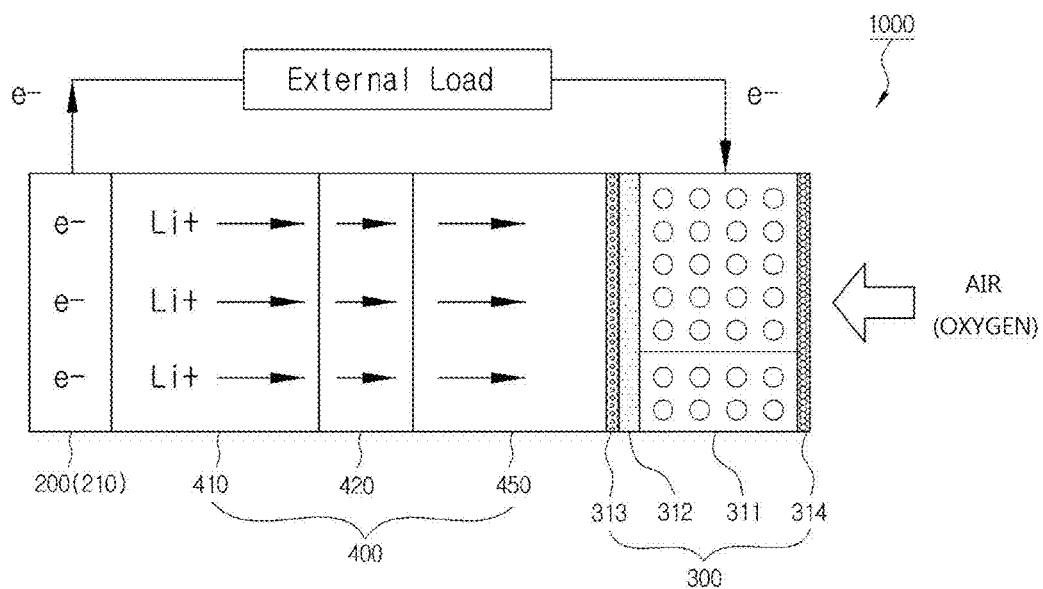
FIG. 1 is a conceptual diagram showing a lithium air battery of the present invention.
Figure 2:
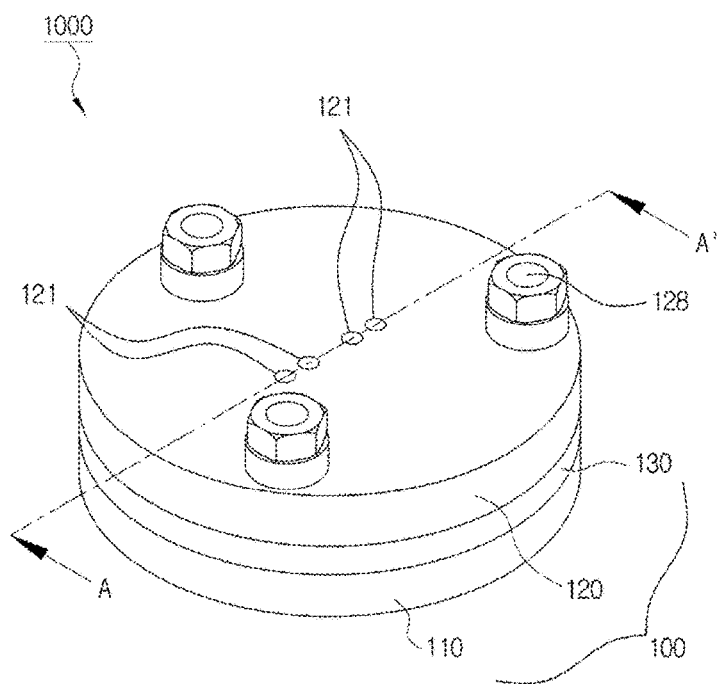
FIGS. 2 and 3 are an assembled perspective view and an exploded perspective view of a lithium air battery according to an embodiment of the present invention, respectively.
Figure 3:
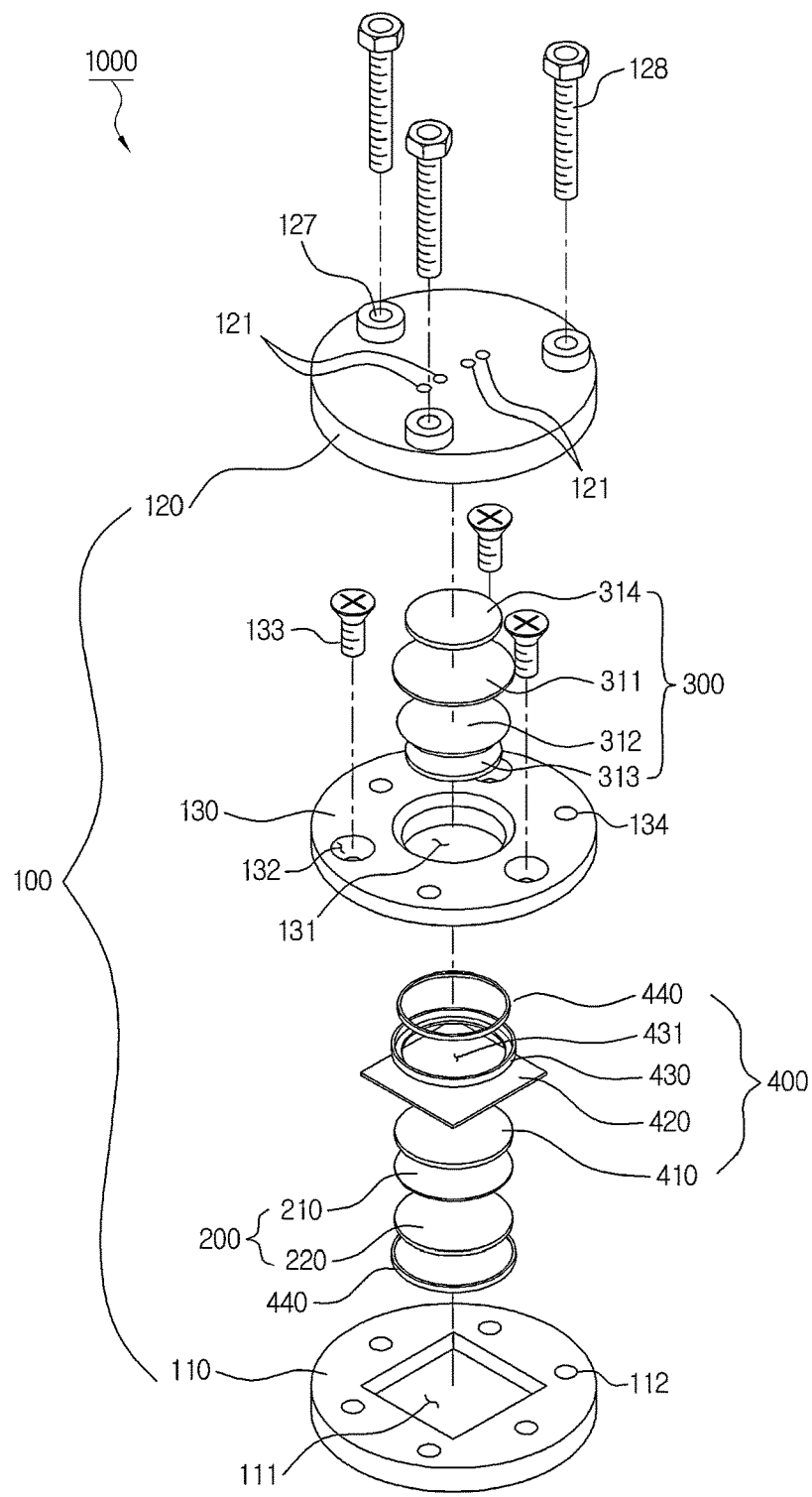

FIG. 1 is a conceptual diagram showing a lithium air battery of the present invention, and FIGS. 2 and 3 are an assembled perspective view and an exploded perspective view of a lithium air battery according to an embodiment of the present invention, respectively.

As shown in the drawings, the lithium air battery 1000 according to the present invention includes: a first electrode part 200 including a lithium metal 210; a second electrode part 300 including a gas diffusion layer 311 of which one side contacts an air, a catalyst layer 312 formed at the other side of the gas diffusion layer 311, and a membrane 313 coupled to the catalyst layer 312 so that lithium ions pass therethrough, and spaced apart from the first electrode part 200; and an electrolyte part 400 provided between the first electrode part 200 and the second electrode part 300.

First, the lithium air battery 1000 of the present invention largely consists of the first electrode part 200, the second electrode part 300, and the electrolyte part 400.

The first electrode part 200 may include a lithium metal 210 capable of storing and emitting the lithium ions, and may further include a binder. Examples of the lithium metal 210 may include a lithium metal, an alloy based on the lithium metal, a lithium intercalating compound, and the like, and among them, a lithium alloy is preferred in order to improve durability with respect to moisture, and the like. Examples of the binder may include polyvinylidene fluoride (PVdF), polytetrafluoroethylene (PTFE), and the like, and a content, of the binder is not specifically limited, but may be 30 wt % or less, and more specifically, 1 to 10 wt %.

The second electrode part 300 includes the gas diffusion layer (GDL) 311 of which one side contacts an air, the catalyst layer 312, and the membrane 313, and is spaced apart from the first electrode part 200. Here, as shown in FIG. 1, the second electrode part 300 includes the membrane 313 disposed on a surface facing the first electrode part 200 and is formed by forming the catalyst layer 312 on one side of the gas diffusion layer 311, and coupling the membrane 313 to one side of the catalyst layer 312. Then, air is diffused through the gas diffusion layer 311, such that an oxidation-reduction reaction between lithium ions and oxygen in the air is generated in the catalyst layer 312.

Here, the second electrode part 300 may use oxygen in the air as an active material and may contain conductive materials having pores through which oxygen and lithium ions pass, and the catalyst layer 312 may be formed by mixing platinum (Pt) and binder and applying or coating the mixture. That is, the catalyst layer 312 may be formed by mixing the catalyst, the conductive material, and the binder, performing a press-molding process on the gas diffusion layer (or carbon paper) 311, or by mixing the catalyst, the conductive material, and the binder and then dissolving or dispersing the mixture into an organic solvent such as acetone, methyl ethyl ketone, N-methyl-2-pyrrolidone, or the like, to thereby prepare a slurry, applying' the prepared slurry on the gas diffusion layer 311 by gravure coating, blade coating, comma coating, dip coating methods and dispensing an organic solvent, followed by pressing.

In addition, as the conductive material, carbon materials, conductive fibers such as metal fiber, and the like, metal powder such as copper, silver, nickel, aluminum, and the like, organic conductive materials such as polyphenylene derivatives, and the like, may be used. As the carbon material, carbon black, graphite, activated carbon, carbon nanotube, carbon fiber, and the like, may be used, and mesoporous carbon obtained by firing synthetic resin containing an aromatic ring compound, petroleum pitch, and the like, may be used.

The electrolyte part 400 is provided between the first electrode part 200 and the second electrode part 300, such that the lithium ions are movable.

Therefore, the first electrode part 200 including the lithium metal 210 becomes an anode, and the second electrode part 300 becomes a cathode, and the electrolyte part 400 is provided between the first electrode part 200 and the second electrode part 300, thereby configuring the lithium air battery 1000.

Here, in the lithium air battery 1000, at the time of charge and discharge the battery, air is diffused through the gas diffusion layer 311 of the second electrode part 300, such that the oxidation-reduction reaction between oxygen in the air and the lithium ions is generated in the catalyst layer 312, and when the charge and discharge is repeated, crack may occur in the catalyst layer 312, such that particles (platinum, binder, and conductive materials) forming the catalyst layer 312 may be detached from the gas diffusion layer 311 toward the electrolyte part 400. Therefore, performance of the lithium air battery may be deteriorated and life span thereof may be reduced.

Here, in the lithium air battery 1000 of the present invention, the catalyst layer 312 of the second electrode part 300 is coupled to the membrane 313 allowing the lithium ions to be passed therethrough and preventing the particles of the catalyst layer 312 from being detached, such that even though the charge and discharge of the battery is repeated, performance deterioration may be prevented and life span may be extended.

Figure 5:
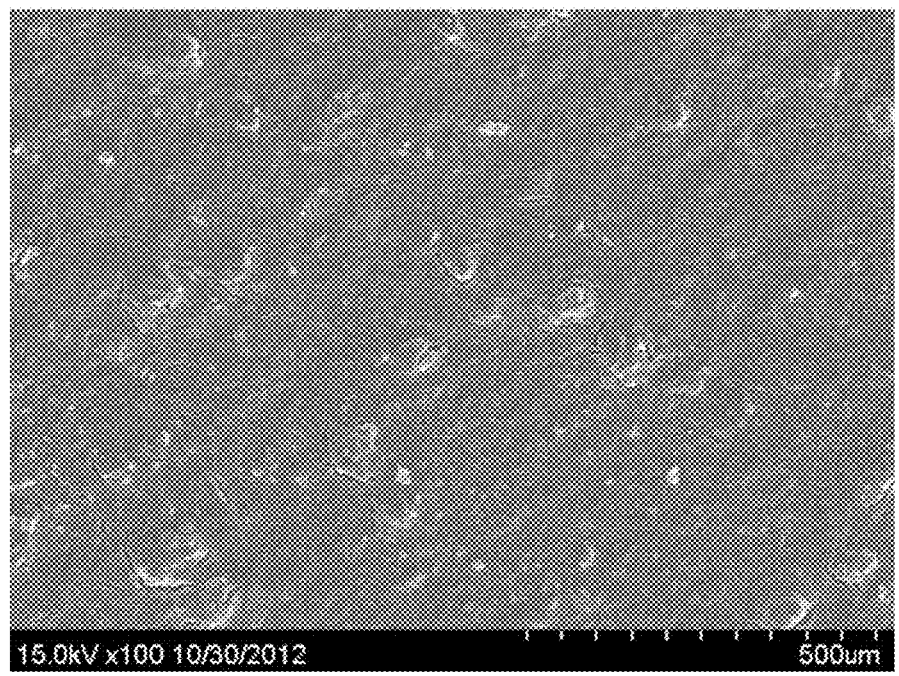
FIG. 5 is a photograph showing a surface of an initial state of a catalyst layer containing platinum and a binder mixed thereto.
Figure 6:
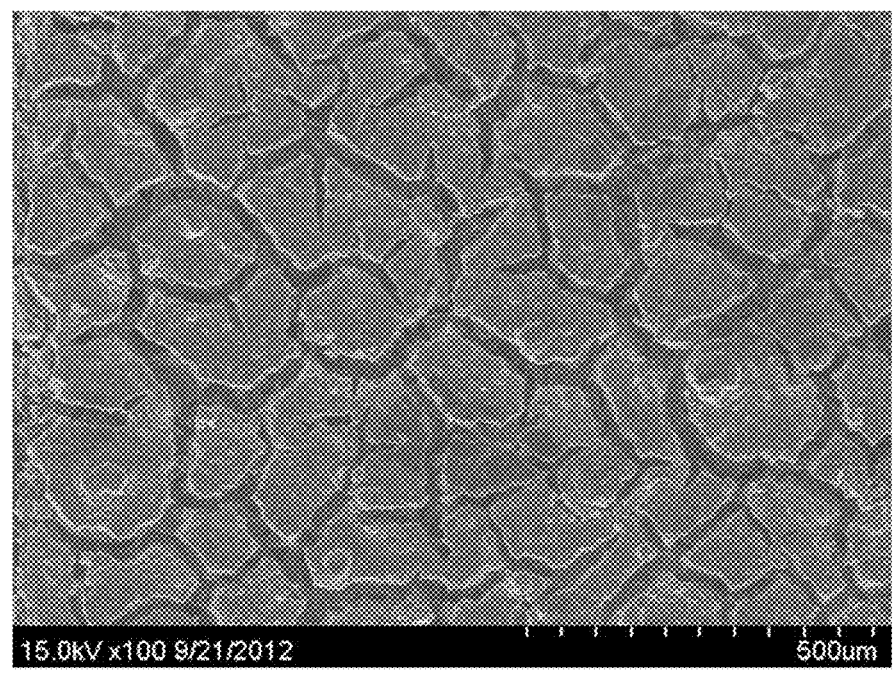
FIG. 6 is a photograph showing the catalyst layer of FIG. 5 after repetition of charge and discharge cycles 200 times.
Figure 7:
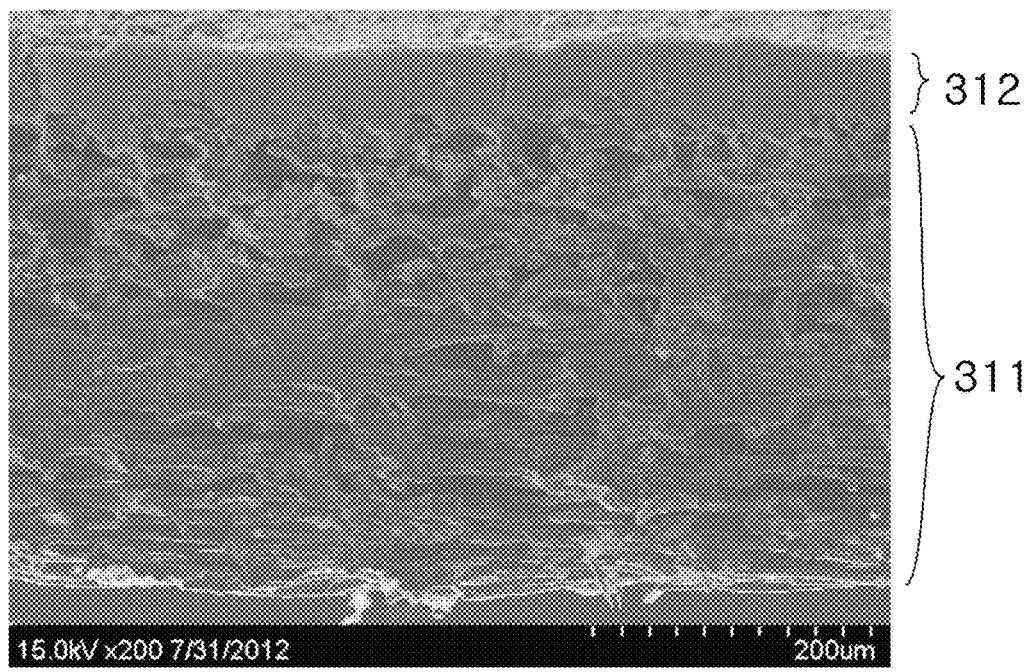
FIG. 7 is a photograph showing a cross-section of the initial state of catalyst layer containing platinum and the binder mixed thereto and an gas diffusion layer.
Figure 8:
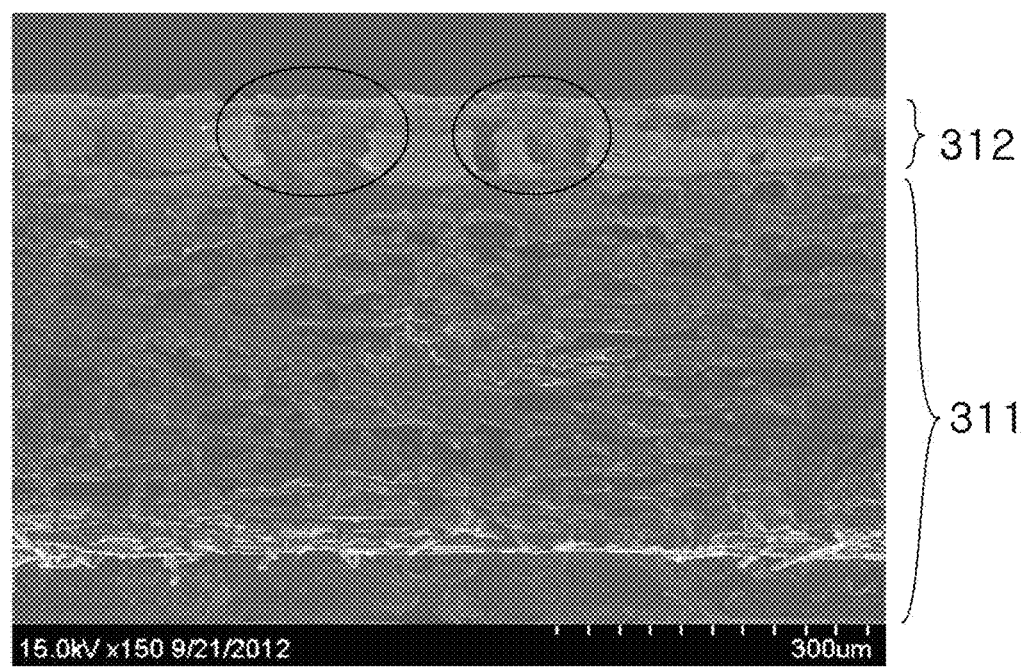
FIG. 8 is a photograph showing a cross-section of the catalyst layer of FIG. 7 having a state in which particles therein are detached after repetition of the charge and discharge cycles 200 times.

FIGS. 5 and 6 are scanning electron microscope (SEM) photographs showing each surface of catalyst layers containing platinum and a binder mixed thereto between an initial state and after repetition of charge and discharge cycles 200 times, respectively, FIGS. 7 and 8 are scanning electron microscope (SEM) photographs showing each cross-section of the gas diffusion layer and the catalyst layer between an initial state and after repetition of the charge and discharge cycles 200 times.

That is, it may be appreciated from FIG. 6 that after repetition of the charge and discharge, cracks occur in the catalyst layer 312, and therefore, from FIG. 8 that a portion (shown by oval circle) of the catalyst layer 312 is detached out from the gas diffusion layer 311, which may be appreciated from the following Table 1 that platinum catalyst is detached from the catalyst layer due to repetition of the charge and discharge even in a content of the platinum (Pt) catalyst incorporated into the electrolyte part measured by inductively coupled plasma automic emission spectroscopy (ICP).

The following Table 1 shows a mass (mg/kg) per unit weight of platinum contained in the water-based electrolyte after repeating the charge and discharge of lithium air batteries in which platinum mass fractions of the catalyst layer 312 are 10 wt % and 40 wt %, respectively and then performing an analysis by ICP.

TABLE 1

| Catalyst | Water-based Electrolyte (Platinum 10 wt %) | Water-based Electrolyte (Platinum 40 wt %) |
| --- | --- | --- |
| Platinum (Pt) | 33.7 | 51.1 |

Therefore, according to the present invention, the membrane 313 coupled to the catalyst layer 312 may prevent the catalyst layer 312 from being detached, such that performance deterioration of the lithium air battery may be prevented and life span thereof may be extended.

In addition, the electrolyte part 400 may include a separator 410 closely adhered on one side of the first electrode part 200 and containing an organic-based electrolyte, a solid electrolyte 420 closely adhered on one side of the separator 410, and a water-based electrolyte 450 provided between the solid electrolyte 420 and the second electrode part 300.

Therefore, electrochemical properties and charge and discharge performance of the lithium air battery may be improved. Here, since the membrane 313 is disposed between the water-based electrolyte 450 and the catalyst layer 312 of the second electrode part 300 to be coupled to the catalyst layer 312, detachment of the catalyst layer 312 according to the repetition of the charge and discharge is prevented, such that particles of the catalyst layer 312 may be prevented from being incorporated into the water-based electrolyte 450.

Herein, an organic based electrolyte, the solid electrolyte 420, and the water-based electrolyte 450 will be described in more detail in the lithium air battery according to the embodiment of the present invention.

In addition, the second electrode part 300 further includes a microporous polyolefin-based film 314 coupled on one side of the gas diffusion layer 311.

That is, the microporous polyolefin-based film 314 is coupled on one side of the gas diffusion layer 311 to thereby suppress the water-based electrolyte 450 solvent from being evaporated, such that even though the charge and discharge of the lithium air battery is repeated, performance deterioration thereof may be prevented and life span thereof may be extended.

In addition, the lithium air battery 1000 according to the embodiment of the present invention includes a housing part 100 including a first housing 110 provided with a space part 111 having an open upper side, and a second housing 120 having an air accommodation part 122 disposed at an upper portion of the first housing 110, sealing the space part 111 of the first housing 110, and having an open lower side and ventilation holes 121 formed therein to communicate with the air accommodation part 122, the first electrode part 200 including the lithium metal 210 accommodated into the space part 111 of the first housing 110; the second electrode part 300 coupled to a lower side of the air accommodation part 122 of the second housing 120 to be spaced apart from the first electrode part 200, and having the gas diffusion layer 311 disposed on an upper side thereof, the catalyst layer 312 disposed on a lower side of the gas diffusion layer 311, and the membrane 313 disposed on a lower side of the catalyst layer 312 to allow lithium ions to pass therethrough; and the electrolyte part 400 provided in the space part 111 of the first housing 110 and provided between the first electrode part 200 and the second electrode part 300.

Figure 4:
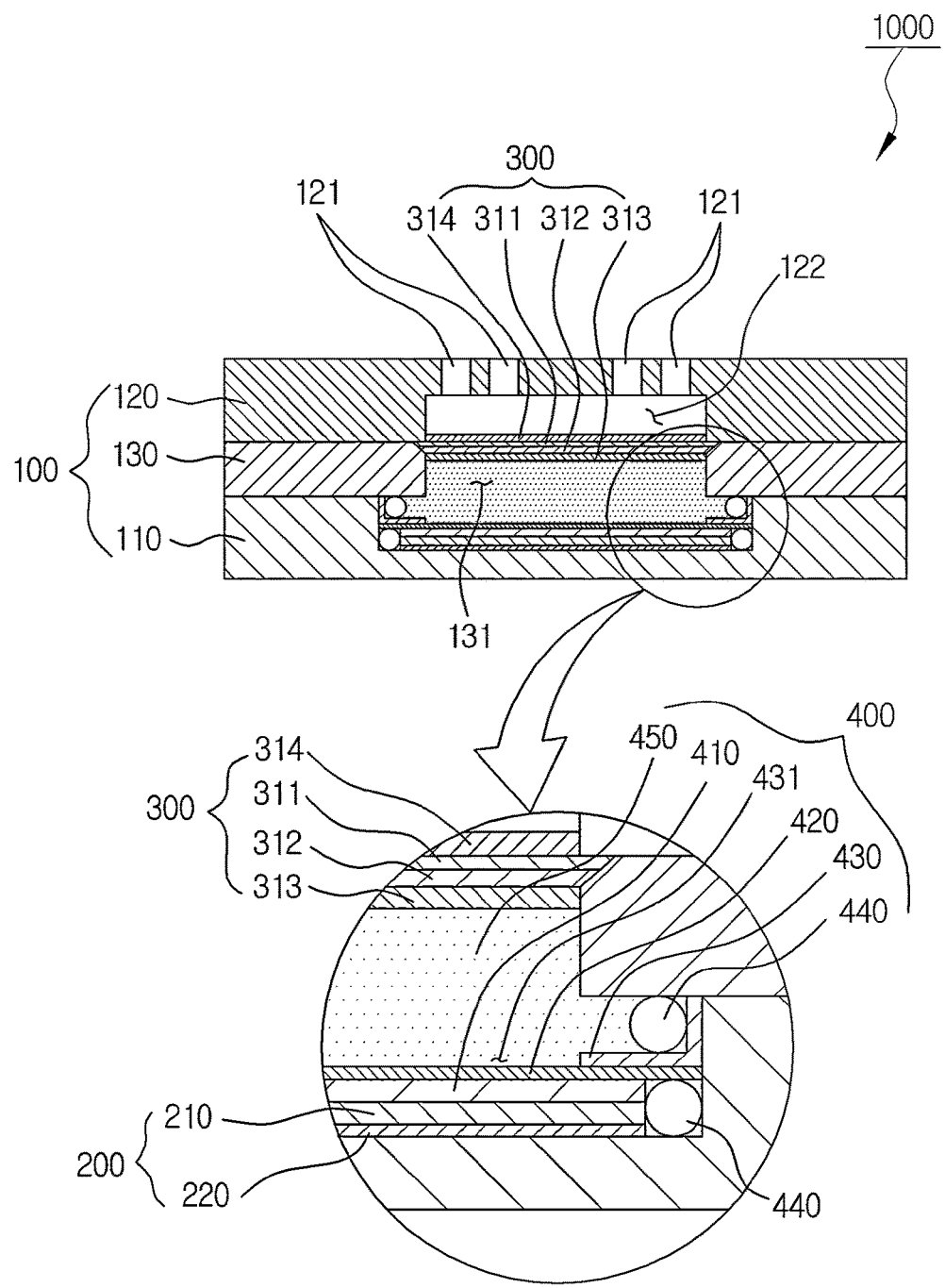
FIG. 4 is a cross sectional view taken along line AA' of FIG. 2.

That is, as shown in FIGS. 2 to 4, the lithium air battery 1000 according to the embodiment of the present invention largely includes the first electrode part 200, the second electrode part 300, and the electrolyte part 400 in the housing part 100.

The housing part 100 includes the first housing 110 and the second housing 120. The first housing 110 has a disc shape and includes the space part 111 formed therein, wherein the space part 111 is formed so that an upper side thereof is open. In addition, the second housing 120 also has a disc shape and is disposed on an upper portion of the first housing 110 and coupled so as to seal the space part 111 of the first housing 110. Here, the second housing 120 includes the air accommodation part 122 formed on a lower side thereof and includes ventilation holes 121 so as to communicate with the air accommodation part 122, such that external air may flow into the air accommodation part 122 or may flow out to the air accommodation part 122, through the ventilation holes 121. The number of ventilation holes 121 may be one or plural, wherein the ventilation hole 121 may have various shapes so that air flows into the air accommodation part 122 and or flows out to the air accommodation part 122.

In addition, the second housing 120 has first fixing parts 127 formed at one side thereof to be coupled to the first housing 110, wherein first coupling parts 128 are inserted into the first fixing parts 127, such that the first housing 110 may be coupled to the second housing 120. The first fixing part 127 of the second housing 120 according to a first embodiment of the present invention is formed of a through hole, the first coupling part 128 is formed of a bolt, the first housing 110 includes a coupling hole 112 as a female screw formed at a position corresponding to the first fixing part 127, such that the first coupling part 128 is coupled to the coupling hole 112 by penetrating through the first fixing part 127, whereby the first housing 110 and the second housing 120 may be coupled to each other. Here, the first housing 110 and the second housing 120 may be coupled in various schemes such as fit, welding, riveting, and the like, in addition to screw connection.

The first electrode part 200 includes a lithium metal 210, and the lithium metal 210 is accommodated into the space part 111 of the first housing 110.

The second electrode part 300 is coupled to the second housing 120 so as to seal the open lower side of the air accommodation part 122 of the second housing 120, and includes the gas diffusion layer 311 positioned at an upper side thereof and the catalyst layer 312 positioned at a lower side thereof, wherein the lower side of the catalyst layer 312 may be coupled to the membrane 313. Therefore, air accommodated into the air accommodation part 122 is diffused through the gas diffusion layer 311, such that an oxidation-reduction reaction between lithium ions and oxygen in the air may be generated in the catalyst layer 312.

The electrolyte part 400 may be provided in the space part 111 of the first housing 110, and may be disposed on the upper portion of the first electrode part 200. The electrolyte part 400 is provided between the first electrode part 200 and the second electrode part 300, such that the lithium ions are movable.

That is, the first electrode part 200 including the lithium metal 210 becomes an anode, and the second electrode part 300 becomes a cathode, and the electrolyte part 400 is provided between the first electrode part 200 and the second electrode part 300, thereby configuring the lithium air battery 1000.

Therefore, in the lithium air battery 1000 according to an embodiment of the present invention, even though the charge and discharge of the battery is repeated, the membrane 313 coupled to the lower side of the catalyst layer 312 of the second electrode part 300 may prevent the particles of the catalyst layer 312 from being detached toward the electrolyte part 400, such that performance deterioration of the lithium air battery may be prevented and life span thereof may be extended.

Here, the electrolyte part 400 may include a separator 410 closely adhered on an upper side of the first electrode part 200 and containing an organic-based electrolyte, a solid electrolyte 420 closely adhered on an upper side of the separator 410, and a water-based electrolyte 450 provided between the solid electrolyte 420 and the second electrode part 300. Therefore, electrochemical properties and charge and discharge performance of the lithium air battery may be improved.

In addition, the second electrode part 300 may further include the microporous polyolefin-based film 314 coupled to an upper side of the gas diffusion layer 311, wherein the microporous polyolefin-based film 314 may prevent the water-based electrolyte 450 solvent from being evaporated. In addition, since the microporous polyolefin-based microporous film has extremely small size (about 10 nm) of pores and a hydrophobic property, evaporation of moisture which is the water-based electrolyte 450 solvent may be significantly suppressed.

Further, the electrolyte part 400 further includes an accommodation body 430 provided on an upper side of the solid electrolyte 420 and having an accommodation hole 431 vertically penetrating therethrough, and the accommodation body is disposed so that the solid electrolyte 420, the separator 410, and the first electrode part 200 are closely adhered to the space part.

That is, as shown in FIG. 4, an upper edge part of the accommodation body 430 is pressed down by the second housing 120, and the solid electrolyte 420, the separator 410, and the first electrode part 200 may be closely adhered onto bottom surface of the space part 111 due to the accommodation body 430. Here, the accommodation body 430 has the accommodation hole 431 formed in the center portion thereof so as to vertically penetrate therethrough, such that the water-based electrolyte 450 contacts the solid electrolyte 420 through the accommodation hole 431, whereby lithium ions may be movable.

Therefore, the lithium air battery 1000 according to an embodiment of the present invention has decreased contact resistance among the electrolyte part 400, the first electrode part 200, and the first housing 110, such that efficiency and performance of the lithium air battery may be improved, and life span thereof may be extended.

Here, a current collector 220 having a net shape may be provided on a lower side of the lithium metal 210, such that the lithium metal 210, the electrolyte part 400, and the first housing 110 accommodated into the space part 111 of the first housing 110, wherein the current collector 220 has a flexible net shape, such that the lithium metal 210 and the electrolyte part 400 may contact each other so that the reaction is favorably performed. That is, the current collector 220, the lithium metal 210, and the electrolyte part 400 accommodated into the space part 111 of the first housing 110 may be closely adhered to each other by the coupling of the second housing 120 to thereby significantly decrease the contact resistance. In addition, the current collector 220 may be made of copper, stainless, nickel, and the like.

Further, the electrolyte part 400 may further include a first sealing part 440 allowing the first electrode part 200 to be accommodated into the space part 111 so as to seal the space part 111.

The first sealing part 440 is interposed between edge parts of the electrolyte part 400, and then due to the coupling of the first housing 110 and the second housing 120, the first electrode part 200 is closed in the space part 111 by the electrolyte part 400 and the first sealing part 440. That is, since the water-based electrolyte 450 is not allowed to flow into the first electrode part 200, corrosion of the lithium metal 210 may be prevented, such that performance and life span of the lithium air battery may be improved.

Here, as shown in the drawings, the first sealing part 440 such as O-ring may be formed at a lower side edge part of the solid electrolyte 420 and an upper side edge part of the accommodation body 430, of the electrolyte part 400, respectively, to thereby improve sealing strength for sealing the first electrode part 200 into the space part 111. In addition, the separator 410 containing an organic electrolyte may also be sealed by the solid electrolyte 420 and the first sealing part 440.

Further, the housing part 100 may further include a third housing 130 interposed between the first housing 110 and the second housing 120 and having a fixing hole 131 vertically penetrating therethrough so that the second electrode part 300 is fixed to the fixing hole 131.

That is, as shown in FIGS. 3 and 4, the third housing 130 is interposed between the first housing 110 and the second housing 120 and closely adhered thereto. Here, the first electrode part 200 and the electrolyte part 400 are accommodated into the space part 111 of the first housing 110 and the third housing 130 is coupled thereto from an upper side thereof, such that the electrolyte part 400, the first electrode part 200, and the bottom surface of the space part 111 of the first housing 110 may be coupled to each other so as to be closely adhered, and the first housing 110 and the third housing 130 may perform screw-connection between the second coupling part 133 formed of a bolt and the coupling hole 112 having female screw thread formed in the first housing 110. Here, the second fixing part 132 formed of the through hole through which the second coupling part 133 penetrates may be formed in the third housing 130, wherein the second fixing part 132 has an inclined upper side, the second coupling part 133 is formed of a flat headed bolt, such that an upper side head part of the second coupling part 133 does not protrude upwardly than an upper surface of the third housing 130, whereby the second housing 120 may be easily closely adhered and coupled to the upper side of the third housing 130.

Then, the second housing 120 is closely adhered to the upper side of the third housing 130 and the through-hole 134 is formed in the third housing 130, such that the first coupling part 128 may penetrate through the first fixing part 127 and the through-hole 134 to perform screw-connection to the through-hole 112 of the first housing 110.

Here, an edge of the second electrode part 300 is closely adhered and fixed between the upper side edge part of the fixing hole 131 formed in the third housing 130 and the second housing 120. In this case, as shown in the drawings, the upper side edge part of the fixing hole 131 may be inclined, and may have a step, such that the edge of the second electrode part 300 may be positioned at the step and fixed thereto. In addition, the water-based electrolyte 450 may be accommodated into the fixing hole 131, such that ions may be moved between the first electrode part 200 and the second electrode part 300.

Therefore, the first housing 110, the second housing 120, and the third housing 130 may be tightly coupled to each other to be closely adhered, adhesion strength between the first electrode part 200 and the electrolyte part 400 may be improved, and the second electrode part 300 may be easily coupled to the fixing hole and fixed thereto.

That is, the lithium air battery 1000 according to the embodiment of the present invention includes the housing part 100 having the first housing 110, the second housing 120, and the third housing 130, such that sealing property may be more excellent and durability may be improved as compared to the existing lithium air battery having an open upper portion and a large space part formed therein.

Further, the membrane 313 may be a porous membrane containing a sulfonic acid group, more preferably, may be made of a polyperfluorosulfonic acid (PFSA) resin having a porous material. In addition, the membrane 313 may be closely adhered to the catalyst layer by heating and pressing the PFSA resin. Further, the membrane 313 may be formed by a dip-coating method using a PFSA resin solution. The PFSA membrane has a proton ($H^+$, hydrogen ion)-conductivity (0.1 S/cm) and consists of hydrophilic sulfonyl group and hydrophobic fluorinated backbones in view of a molecular structure. Therefore, the membrane has a hydrophilic property and the proton-conductivity property to pass through $Li^+$ ions and absorb water required for a reaction with oxygen and water, thereby making function of lithium-air smooth, which is appropriate for protection of platinum (Pt) catalyst layer according to an object of the present invention.

That is, the membrane 313 may be made of a material in which particles of the catalyst layer 312 are capable of being prevented from being detached, and lithium ions are movable, which is the most preferred in view of performance of the lithium air battery.

In addition, the membrane 313 may be closely adhered to the catalyst layer 312 by performing a heating process and a pressing process. That is, the membrane 313 is heated and pressed by a high temperature on the catalyst layer 312, such that coupling strength between the catalyst layer 312 and the membrane 313 may be improved, thereby definitely blocking detachment of the particles of the catalyst layer 312 due to the repetition of the charge and discharge of the battery.

In addition, herein, the water-based electrolyte 450 may be used by dissolving lithium acetate dihydrate ($C_2H_3LiO_2$, Sigma-Aldrich), lithium chloride (LiCl, Sigma-Aldrich), lithium hydroxide (LiOH, Sigma-Aldrich) salts into D.I. water at a concentration of 1 mole. The water-based electrolyte 450 may be selected from an ionic liquid, that is, a compound represented by the following Chemical Formula 1 and mixtures thereof.

$$X^+Y^- \quad \text{[Chemical Formula 1]}$$

[in Chemical Formula 1 above, $X^+$ is a imidazolium ion, a pyrazolinium ion, a pyridinium ion, a pyrolidium ion, an ammonium ion, a phosphonium or a sulfonium ion; $Y^-$ is $(CF_3SO_2)_2N^-$, $(FSO_2)SN^-$, $BF_4^-$, $PF_6^-$, $AlCl_4^-$, halogen$^-$, $CH_3CO_2^-$, $CF_3CO_2^-$, $CH_3SO_4^-$, $CF_3SO_3^-$, $(CF_3SO_2)N^-$, $NO_3^-$, $SbF_6^-$, $MePhSO_3^-$, $(CF_3SO_2)_3C^-$, or $(R")_2PO_2^-$ (wherein R" is C1-C5 alkyl).]

In Chemical Formula 1 above, cation ($X^+$) may be exemplified by the following Table 2:

TABLE 2

| Cation ($X^{+)}$) | Structural Formula |
| --- | --- |
| Imidazolium Ion | (structure with $R^1$, $R^2$, $R^3$) |
| Pyridinium Ion | (structure with R, $R^6$) |
| Phosphonium Ion | (structure with $R^{11}$, $R^{12}$, $R^{13}$, $R^{14}$) |
| Pyrazolium Ion | (structure with $R^{18}$, $R^{19}$, $R^{20}$) |
| Pyrrolidium Ion | (structure with $R^4$, $R^5$) |
| Ammonium Ion | (structure with $R^7$, $R^8$, $R^9$, $R^{10}$) |

TABLE 2-continued

| Cation ($X^{+)}$) | Structural Formula |
| --- | --- |
| Sulfonium Ion | (structure with $R^{15}$, $R^{16}$, $R^{17}$) |

In Table 2 above, $R^1$ to $R^{20}$ and R are each (C1-C20) alkyl, (C2-C20) alkenyl or (C2-C20) alkynyl, and wherein the alkyl, alkenyl and alkynyl may be further substituted with at least one selected from hydroxy, amino, —$SO_3H$, —COOH, (C1-C5)alkyl, (C1-C5)alkoxy, $Si(R^{21})(R^{22})(R^{23})(R^{21}, R^{22}$ and $R^{23}$ are each independently hydrogen or (C1-C5)alkyl, (C1-C5)alkoxy).

In Chemical Formula 1 above, anion ($Y^-$) may be exemplified by the following Table 3:

TABLE 3

| Anion ($Y^-$) | Name of Anion |
| --- | --- |
| $BF_4^-$ | tetrafluoroborate |
| $PF_6^-$ | hexafluorophosphate |
| $AlCl_4^-$ | aluminium chloride |
| $X^-$ | Halogen$^-$ |
| $CH_3CO_2^-$ | acetate |
| $CF_3CO_2^-$ | trifluoroacetate |
| $CH_3SO_4^-$ | methylsulfate |
| $CF_3SO_3^-$ | trifluoromethylsulfate |
| $(CF_3SO_2)N^-$ | bis[(trifluoromethyl)sulfonyl]amide |
| $NO_3^-$ | nitrate |
| $SbF_6^-$ | hexafluoroanimonate |
| $(FSO_2)_2N^-$ | Bis[fluorosulfonyl]imide |
| $MePhSO_3^-$ | tosylate |
| $(CF_3SO_2)_2N^-$ | bis(trifluoromethylsulfonyl)imide |
| $(CF_3SO_2)_3C^-$ | tris(trifluoromethylsulfonyl)methide |
| $(OR)_2PO_2^-$ | dialkyl phosphate |

Examples of the water-based electrolyte may include 1-methyl-3-ethyl imidazolium bis(trifluoromethanesulfonyl)imide, 1-methyl-3-propyl imidazoliumbis(trifluoromethanesulfonyl)imide, 1-methyl-3-allyl imidazoliumbis (trifluoromethanesulfonyl)imide, 1-methyl-3-ethyl imidazoliumbis(fluorosulfonyl)imide, 1-methyl-3-propyl imidazoliumbis(fluorosulfonyl)imide, 1-methyl-3-allyl imidazoliumbis(fluorosulfonyl)imide, 1-methyl-1-propyl pyrolidium bis(trifluoromethanesulfonyl)imide, 1-methyl-1-allyl pyrolidium bis(trifluoromethanesulfonyl)imide, 1-methyl-1-propyl pyrolidium (fluorosulfonyl)imide, 1-methyl-1-allyl pyrolidium (fluorosulfonyl)imide, 1-butyl-3-methylimidazoliumchloride, 1-butyl-3-methylimidazolium dibutylphosphate, 1-butyl-3-methylimidazolium dicyanamide, 1-butyl-3-methylimidazolium hexafluoroantimonate, 1-butyl-3-methylimidazolium hexafluorophosphate, 1-butyl-3-methylimidazolium hydrogencarbonate, 1-butyl-3-methylimidazolium hydrogensulfate, 1-butyl-3-methylimidazolium methylsulfate, 1-butyl-3-methylimidazolium tetrachloroaluminate, 1-butyl-3-methylimidazolium tetrachloroborate, 1-butyl-3-methylimidazolium thiocyanate, 1-dodecyl-3-methylimidazolium iodide, 1-ethyl-2,3-dimethylimidazolium chloride, 1-ethyl-3-methylimidazolium bromide, 1-ethyl-3-methylimidazolium chloride, 1-ethyl-3-methylimidazolium hexafluorophosphate, 1-ethyl-3-methylimidazolium tetrafluoroborate, 1-hexyl-3-methylimidazolium tetrafluoroborate, 1-butyl-4-methylpyridium chloride, 1-butyl-4-methylpyridium tetrafluoroborate, 1-butyl-4-methylpyridium hexafluorophosphate, benzyldimethyltetradecylammonium chloride, tetraheptylammonium chloride, tetrakis(decyl)ammonium bromide, tributylmethylammonium chloride, tetrahexylammonium iodide, tetrabutylphosphonium chloride, tetrabutylphosphonium tetrafluoroborate, triisobutylmethylphosphonium tosylate 1-butyl-1-methylpyrrolidinium, 1-butyl-1-methylpyrrolidium bromide, 1-butyl-1-methylpyrrolidium tetrafluoroborate, 1-aryl-3-methylimidazolium bromide, 1-aryl-3-methylimidazolium chloride, 1-benzyl-3-methylimidazolium hexafluorophosphate, 1-benzyl-3-methylimidazolium bis(trifluoromethylsulfonyl)imide, 1-butyl-3-methylimidazolium dibutyl phosphate, 1-(3-cyanopropyl)-3-methylimidazolium bis(trifluoromethylsulfonyl)amide, 1,3-dimethylimidazolium dimethyl phosphate, 1-ethyl-2,3-dimethylimidazolium ethyl sulfate, and the like, and preferably, 1-ethyl-3-methylimidazolium aluminum chloride, 1-butyl-4-methylpyridium hexafluorophosphate, benzyldimethyltetradecylaluminum chloride, tributylmethylaluminum chloride, tetrabutylphosphinium tetrafluoroborate, 1-butyl-1-methylpyrrolidium chloride, 1-butyl-3-methylimidazolium tetrachloroaluminate, 1-butyl-4-methylpyridium chloride, 1-butyl-4-methylpyridium tetrafluoroborate, and the like.

The water-based electrolyte may preferably include a cation represented by the following Chemical Formula 2 or 3 in order to have high ion conductivity and viscosity showing excellent electric properties:

[Chemical Formula 2]

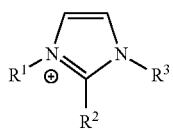

[Chemical Formula 3]

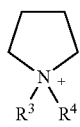

[in Chemical Formula 2 or 3, $R^1$ to $R^4$ are each (C1-C20)alkyl, (C2-C20)alkenyl or (C2-C20)alkynyl, wherein the alkyl, alkenyl and alkynyl may be further substituted with at least one selected from hydroxy, amino, —$SO_3H$, —COOH, (C1-C5)alkyl, (C1-C5)alkoxy, $Si(R^{21})(R^{22})(R^{23})(R^{21}$, $R^{22}$ and $R^{23}$ are each independently hydrogen or (C1-C5)alkyl, (C1-C5)alkoxy).]

More preferably, the water-based electrolyte may include at least one compound selected from the following structures:

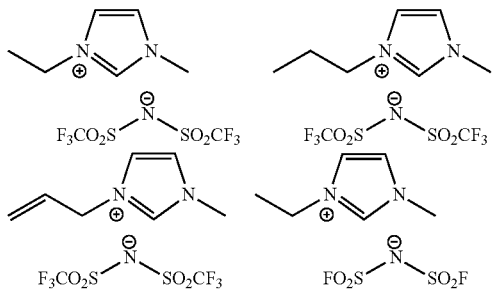

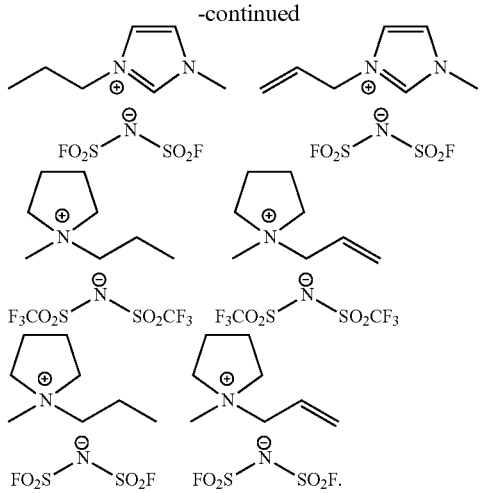

The water-based electrolyte may contain at least one lithium salt selected from a group consisting of $LiPF_6$, LiTFSI (Lithium bis(fluorosulfonly)imide), $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein, x and y are each natural number), LiCl, LiI and $LiB(C_2O_4)_2$, wherein the lithium salt may be contained in a concentration of 0.025 to 1 mole in order for produced $Li_2O_2$ to increase an ion conductivity without hindering a continuous reaction on a surface of porous cathode.

In addition, an organic electrolyte contained in the separator 410 is a non-water-based electrolyte, wherein as the organic electrolyte, an organic solvent not containing water may be used, and as the non-water-based organic solvent, a carbonate-based solvent, an ester-based solvent, an ether-based solvent, a ketone-based solvent, an organosulfur-based solvent, an organophosphorous-based solvent or an aprotic solvent may be used.

As the carbonate-based solvent, dimethyl carbonate (DMC), diethyl carbonate (DEC), ethyl methyl carbonate (EMC), dipropyl carbonate (DPC), methylpropyl carbonate (MPC), ethylpropyl carbonate (EPC), methylethyl carbonate (MEC), ethylene carbonate (EC), propylene carbonate (PC), fluoroethylene carbonate (FEC), butylene carbonate (BC) and the like, may be used, and as the ester-based solvent, methyl acetate, ethyl acetate, n-propyl acetate, dimethyl acetate, methyl propionate, ethyl propionate, γ-butyrolactone, decanolide, valerolactone, mevalonolactone, caprolactone, and the like, may be used.

As the ether-based solvent, dibutyl ether, tetraglyme, diglyme, dimethoxyethane, 2-methyltetrahydrofuran, tetrahydrofuran, and the like, may be used, and as the ketone-based solvent, cyclohexanone, and the like, may be used.

In addition, as the organosulfur-based solvent and the organophosphorous-based solvent, methanesulfonyl chloride and p-trichloro-n-dichlorophosphorylmonophosphazene, and the like, may be used, and as the aprotic solvent, nitriles such as R'CN (R' is C2 to C20 hydrocarbon group having straight chain, branched, or cyclic structure and may include a double bond ring or an ether bond), and the like, amides such as dimethylformamide, and the like, dioxolanes such as 1,3-dioxolane, and the like, sulfolanes, and the like, may be used.

The non-water-based organic solvent may be used alone or two or more thereof may be mixed, and a mixing ratio in the mixture of two or more thereof may be appropriately adjusted according to desired performance of the battery, which may be appreciated by a person skilled in the art.

Here, the non-water-based organic solvent may contain a lithium salt, wherein the lithium salt may be dissolved into the organic solvent to function as a source of the lithium ion in the battery, and for example, the lithium salt serves to promote movement of the lithium ions between the anode and the lithium ion conductive solid electrolyte 420.

The lithium salt may be the same as the lithium contained in the water-based electrolyte or different from each other, and one or two or more selected from a group consisting of $LiPF_6$, LiTFSI (Lithium bis(fluorosulfonly)imide), $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)$ $(C_yF_{2y+1}SO_2)$ (wherein, x and y are each natural number), LiF, LiBr, LiCl, LiI and $LiB(C_2O_4)_2$(lithium bis(oxalato) borate; LiBOB) may be used as the lithium salt.

The lithium salt may have a concentration of 0.1 to 2.0 mole. In the case in which the lithium salt has the above-described range of concentration, the electrolyte has an appropriate conductivity and viscosity, such that excellent electrolyte performance may be shown, and the lithium ions may be effectively moved. The non-water-based organic solvent may further contain other metal salts such as $AlCl_3$, $MgCl_2$, NaCl, KCl, NaBr, KBr, $CaCl_2$, and the like, in addition to the lithium salt.

The solid electrolyte 420 may indicate a lithium ion conductive solid electrolyte film and may function as a protective film so that water contained in the water-based electrolyte is not directly reacted with lithium contained in the anode. Examples of the lithium ion conductive solid electrolyte 420 may include a lithium ion conductive glass, a lithium ion conductive crystal (ceramic or glass-ceramic) or an inorganic material containing a mixture thereof, and the like.

Hereinafter, the present invention will be more appreciated by the following drawings and examples, which are given by way of illustration but are not intended to limit the protective scope defined by the attached claims of the present invention.

[Preparation Example 1] Preparation of Nafion Coated Air-Cathode

Hot Pressing Method Using Nafion Membrane

Nafion perfluorinated membrane (N-115 or N-117, Sigma-Aldrich) was cut using punch so as to be slightly larger than a diameter of air-cathode (for example, in a case of air-cathode having a diameter of 1.5 cm, Nafion perfluorinated membrane has a diameter of 1.7 cm). A platinum (Pt) catalyst layer of air-cathode was sequentially stacked on the Nafion membrane while contacting to each other, and put into a release film bag. The prepared release film bag was maintained under a pressure of 100 kg/cm² for 3 minutes using hot press. Here, the hot press was maintained at a temperature of 135° C. Here, in order to induce change in microstructure of air-cathode, pressure, temperature, and retention time may be changed.

Dip Coating Method Using Nafion Resin Solution

Nafion perfluorinated resin, aqueous dispersion (10 wt % in $H_2O$, Sigma-Aldrich) was put into a Petri dish in an appropriate amount (100 mL in a case of air-cathode having a diameter of 1.5 cm) according to a size of the air-cathode, and then, maintained for 5 to 10 minutes in a state in which the platinum (Pt) layer of the air-cathode was completely immersed thereinto. Next, the reactant was dried under laminar flow in a fume hood at room temperature for 24 hours. As the Nafion resin used in the present Preparation Example 1, a resin solution having a high concentration (for example, 30 wt % in $H_2O$) may be used, and the dipping and drying processes may be repeated 1 to 2 times or a plurality of times according to thickness of the Nafion film and microstructure for finally producing the platinum catalyst layer of the air-cathode.

[Preparation Example 2] Preparation of Microporous Polyolefin-Based Composite Film (or Separator)

The microporous polyolefin-based composite film (or separator) used to suppress evaporation of the electrolyte in the lithium air battery is a porous film containing a polymer binder and an inorganic particle, wherein as the polymer binder, water-soluble polymer and non-soluble polymer are simultaneously used, and the contents thereof are adjusted to enable optimization of heat resistance, adhesive strength, and moisture content.

Preparation Method 1

In order to prepare a microporous polyolefin-based film, high density polyethylene having a weight average molecular weight of $3.8 \times 10^5$ was used. As diluent, dibutyl phthalate and paraffin oil having a 40 kinematic viscosity of 160 cSt were mixed at 1:2 ratio to be used, wherein the content of polyethylene and the diluent were 30 wt %, and 70 wt %, respectively. The composition was pressed out at 240° C. using a biaxial compound having T-die mounted thereon and passed through a section set at 170° C., thereby inducing phase-separation of polyethylene and diluent present in a single phase, and then, a sheet was prepared using casting roll. The sheet prepared using a successive biaxial stretching machine was stretched at a stretching temperature of 128° C. by six times, in a longitudinal direction and a transverse direction, respectively, and after being stretched, a heat setting temperature was 128° C., and a heat setting width was 1-1.2-1.1. A final thickness of the prepared microporous polyethylene-based film was 16 μm, gas permeability (Gurley) was 130 sec, and a void closing temperature was 140° C.

The microporous polyolefin-based film prepared by the above-described method was used, 2.6 wt % of polyvinyl-alcohol having a melting temperature of 220° C. and a saponification degree of 98%, acrylic latex having Tg of −45° C. in a solid content of 3.1 wt % (Rovene 6050), and 47 wt % of $Al_2O_3$ (an average particle size of 0.4 μm) powder were dissolved into deionized water. The thus-prepared reactant was applied onto a cross-section of the microporous polyolefin-based film using a die coating scheme, a solvent was removed and dried by applying a predetermined air volume in an oven at 60° C., thereby finally preparing the microporous polyolefin-based composite film including a coating layer having a thickness of 4.2 um.

Figure 9:
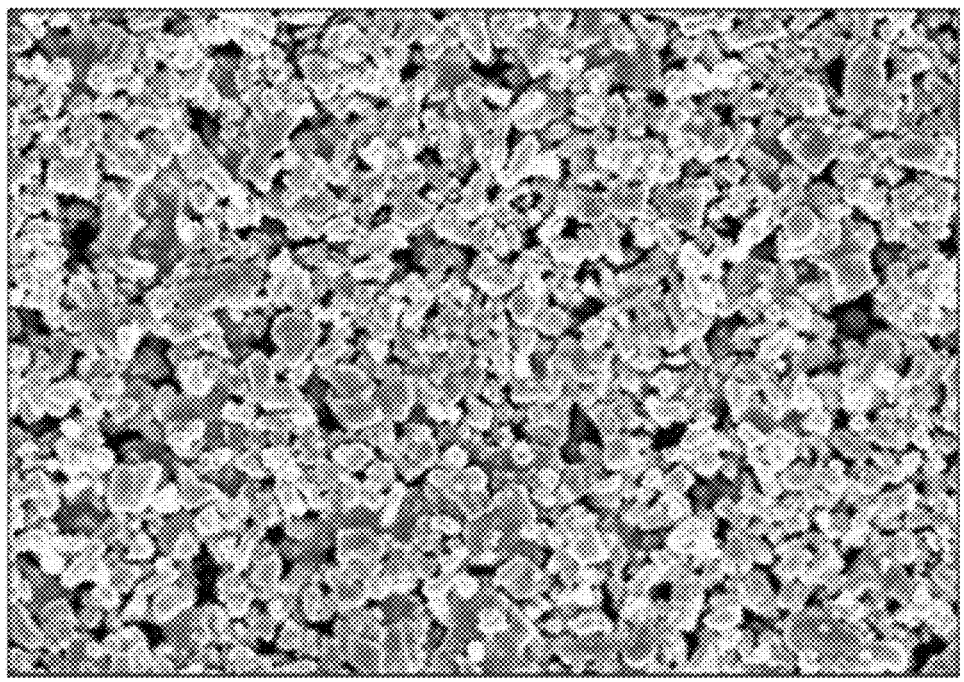
FIG. 9 is a photograph showing a surface of a microporous polyolefin-based film.
Figure 10:
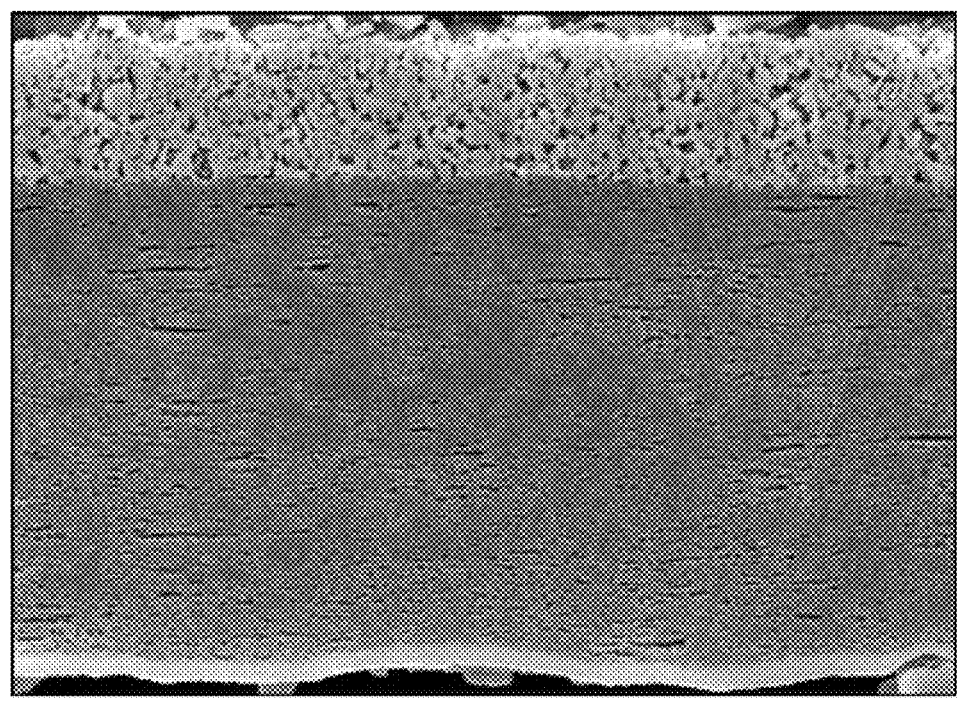
FIG. 10 is a photograph showing a cross-section of the microporous polyolefin-based film of FIG. 9.

A photograph showing a surface of the microporous polyolefin-based composite film prepared by the above-described method was shown in FIG. 9 and a photograph showing a cross section thereof was shown in FIG. 10.

Preparation Method 2

In order to prepare a microporous polyolefin-based film, high density polyethylene having a weight average molecular weight of 3.8×10⁵ was used, and as diluent, dibutyl phthalate and paraffin oil having a 40 kinematic viscosity of 160 cSt were mixed at 1:2 ratio to be used, wherein the content of polyethylene and the diluent were 25 wt %, and 75 wt %, respectively. The composition was pressed out at 240° C. using a biaxial compound having T-die mounted thereon and passed through a section set at 170° C., thereby inducing phase-separation of polyethylene and diluent present in a single phase, and then, a sheet was prepared using casting roll. The sheet prepared using a successive biaxial stretching machine was stretched at a stretching temperature of 128° C. by seven times, in a longitudinal direction and a transverse direction, respectively, and after being stretched, a heat setting temperature was 126° C., and a heat setting width was 1-1.2-1.2. A final thickness of the prepared microporous polyethylene-based film was 9 µm, gas permeability (Gurley) was 110 sec, and a void closing temperature was 139° C.

To the microporous polyolefin-based film as described above, 0.5 wt % of Silanol-polyvinylalcohol copolymer having a melting temperature of 225° C. and a saponification degree of 97.5% and 1.5 wt % (Rovene 4305) of carboxylated Stylene butadiene Latex having Tg of −24° C. were used, and 22 wt % of plate-shaped $Al_2O_3$ (average particle size of 1.5 µm) powder having an aspect ratio of 10 to 20 was dissolved into deionized water to be prepared. The thus-prepared reactant was applied onto a cross-section of the microporous polyolefin-based film using a micro-gravure coating scheme, a solvent was removed and dried by applying a predetermined air volume in an oven at 60° C., thereby finally preparing the microporous polyolefin-based composite film including a coating layer having a thickness of 3.5 um.

Preparation Method 3

The microporous polyolefin-based film prepared by the above-described Preparation Method 1 was used, 0.6 wt % of polyvinylalcohol having a melting temperature of 220° C. and a saponification degree of 99% and acrylic latex having Tg of −45° C. in a solid content of 4.0 wt % (Rovene 6050) were used, and 40 wt % of $Al_2O_3$ (an average particle size of 0.6 µm) powder was dissolved into deionized water. The thus-prepared reactant was applied onto a cross-section of the microporous polyolefin-based film using a die coating scheme, a solvent was removed and dried by applying a predetermined air volume in an oven at 60° C., thereby finally preparing the microporous polyolefin-based composite film including a coating layer having a thickness of 2.5 um.

[Example 1] Preparation of Lithium Air Battery 16.3 g of $LiCH_3COOH$ (lithium acetic acid, molar mass=102.02 g/mol, Sigma-Aldrich), 6.8 g of LiCl (lithium chloride, molar mass=42.39 g/mol, Sigma-Aldrich), and 3.8 g of LiOH (lithium hydroxide, molar mass=23.95 g/mol, Sigma-Aldrich) were dissolved into 1 liter (L) of D.I. water, thereby preparing water-based electrolyte having a concentration of 1M, respectively, as a second electrolyte. A lithium metal thin film was used as an anode, and polypropylene (SKI, F305CHP, 525HV) was used as a separator disposed on the lithium metal thin film. As a porous air-cathode, Nafion coated air-cathode was prepared according to Preparation Example 1 above. As a basic air-cathode, a gas diffusion layer having a platinum catalyst layer (Pt 10 wt %, Fuel Earth, EP1019) was used. The microporous polyolefin-based composite film (SKI, F305CHP, 525HV) used in order to suppress evaporation of the electrolyte was prepared by Preparation Example 2 above.

The anode, which is the lithium metal thin film, was installed in a stainless case, and a separator prepared by injecting one of organic-based electrolytes (1M of LiTFSi in EC:DMC=1:1, 1M of LiTFSi in EC:PC=1:1, 1M of $LiPF_6$ in EC:DEC=1:1) thereto was positioned at a side facing the anode, and a solid electrolyte film (OHARA, AG-01) was mounted thereon, and the accommodation body into which the prepared water-based electrolyte was injected was installed on the solid electrolyte film, such that the anode and the cathode faced each other. Then, a carbon paper washer was disposed on the cathode, and the second housing 120 was pressed out to fix the cell, thereby manufacturing a lithium air battery. 1M $LiCH_3COOH$ in D.I water was used as the water-based electrolyte, 1M LiTFSi in EC:DMC=1:1 having wettability with the separator was used as the organic-based electrolyte, and other materials were used as the same as described above.

In order to evaluate charge and discharge properties of the lithium air battery manufactured by the above-described method, the battery was charged and discharged in a constant current mode of 0.25 mA/cm² under a temperature of 25° C., a pressure of 1 atm, for a predetermined time, which is 24 minutes.

Example 2

Figure 11:
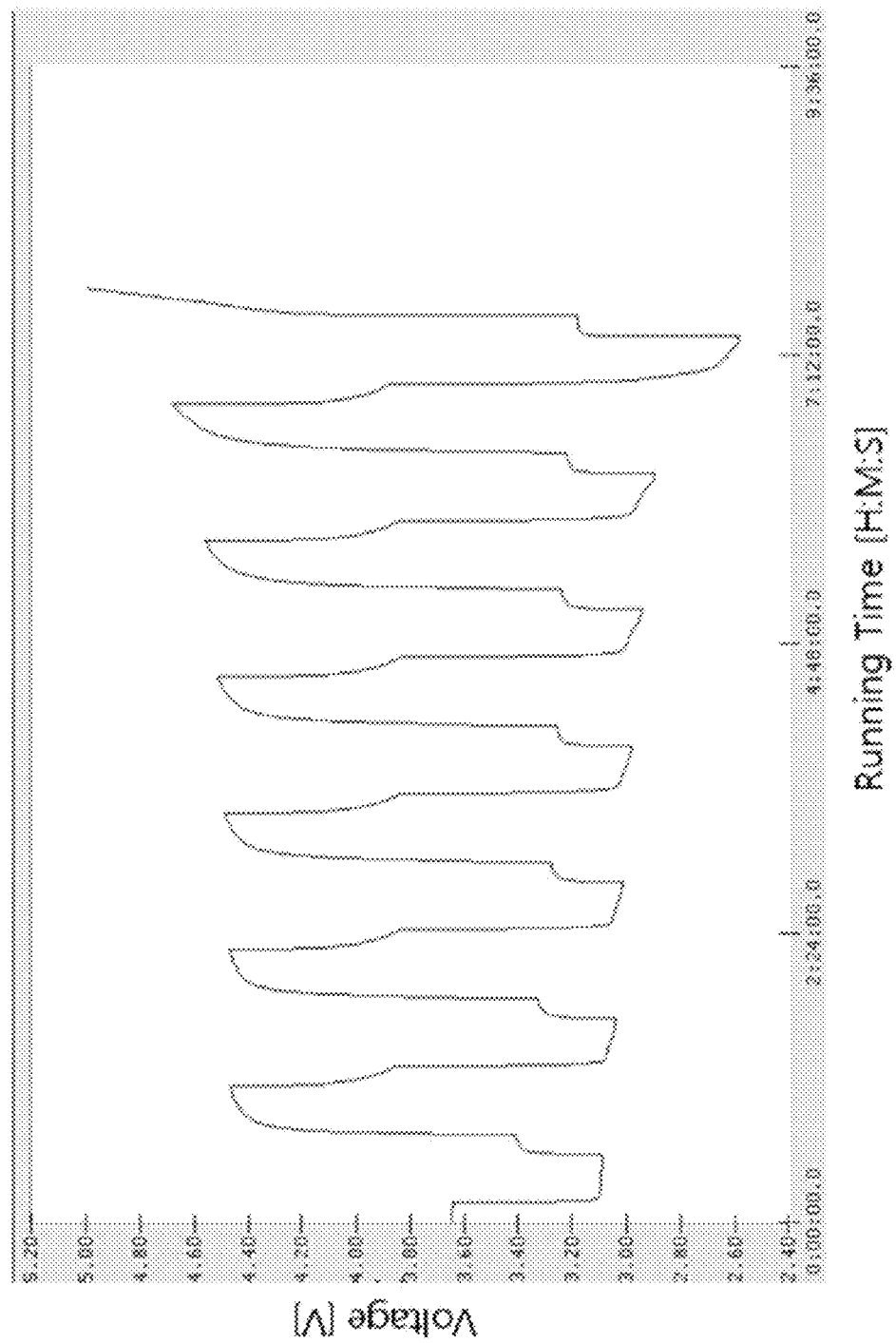
FIG. 11 is a graph showing a charge and discharge cycle of a lithium air battery including porous air-cathode without the microporous polyolefin-based film and Nafion membrane.
Figure 12:
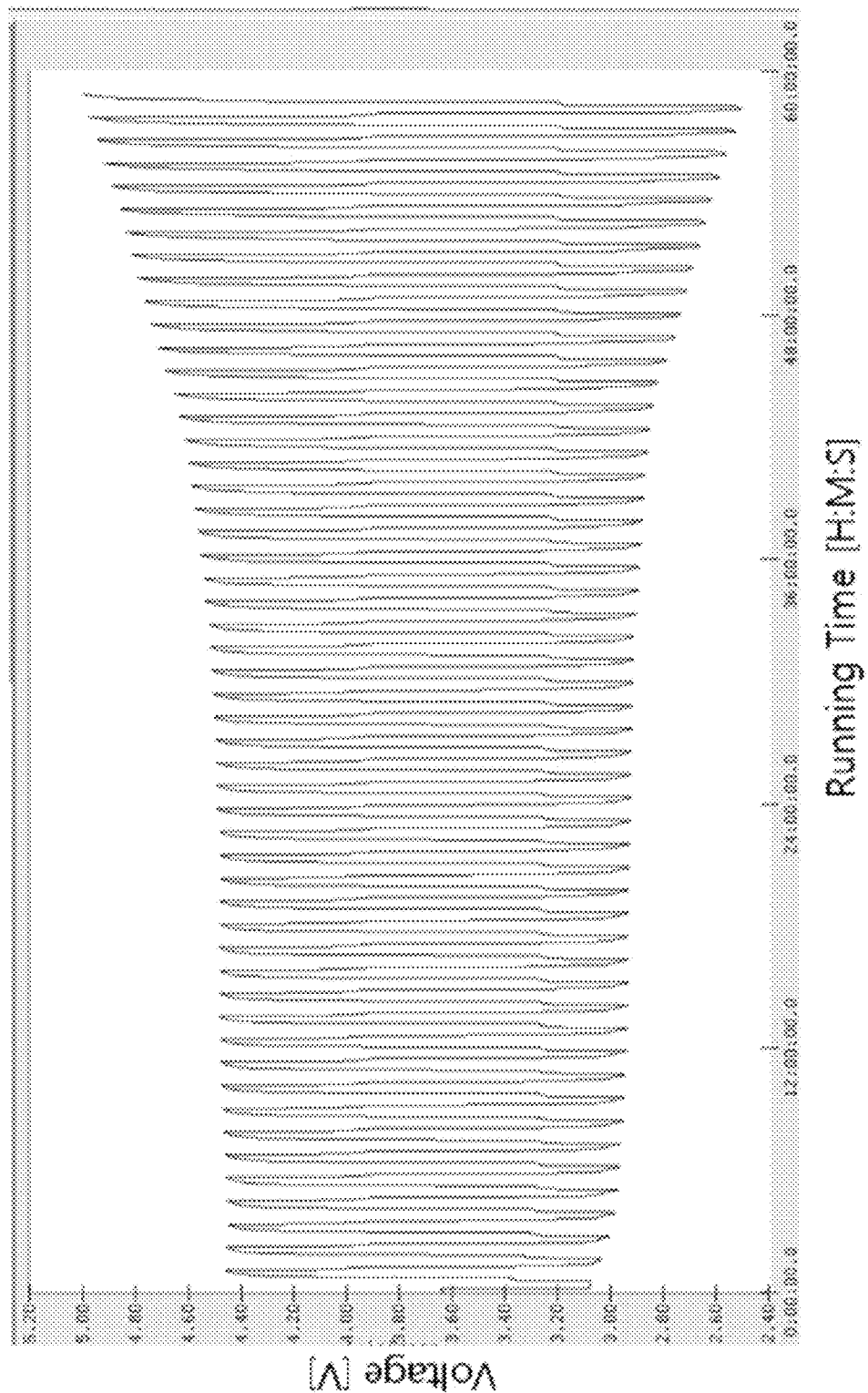
FIG. 12 is a graph showing a charge and discharge cycle of a lithium air battery including porous air-cathode to which Nafion membrane is not applied but the microporous polyolefin-based film is applied.
Figure 13:
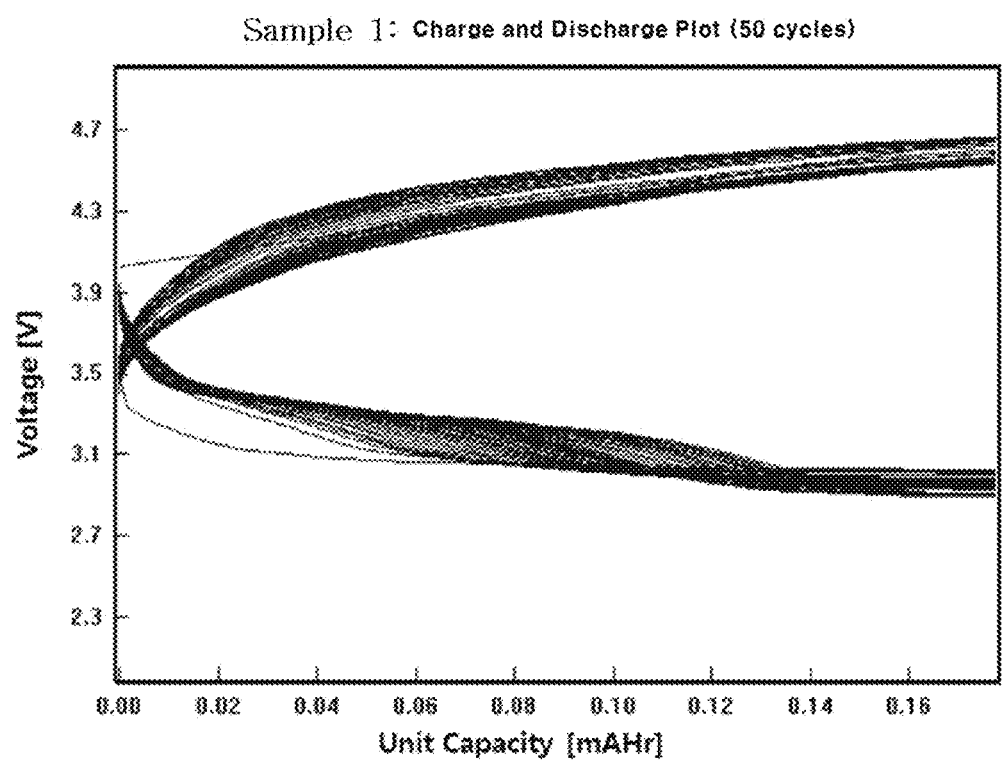
FIG. 13 is a graph showing a charge and discharge cycle of a lithium air battery (sample 1) including porous air-cathode to which both of Nafion membrane and the microporous polyolefin-based film are applied.
Figure 14:
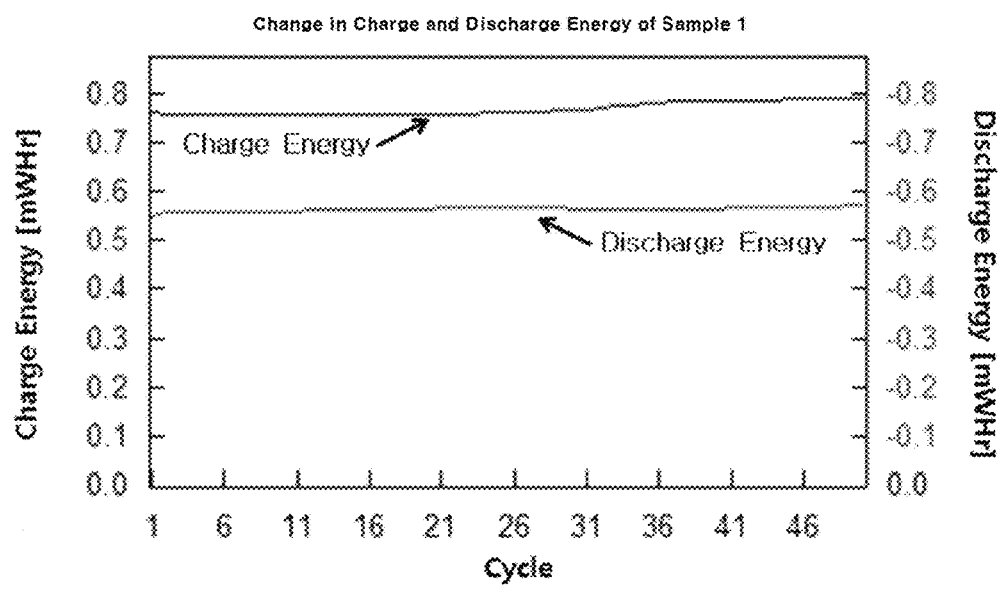
FIG. 14 is a graph showing charge and discharge energy of sample 1.
Figure 15:
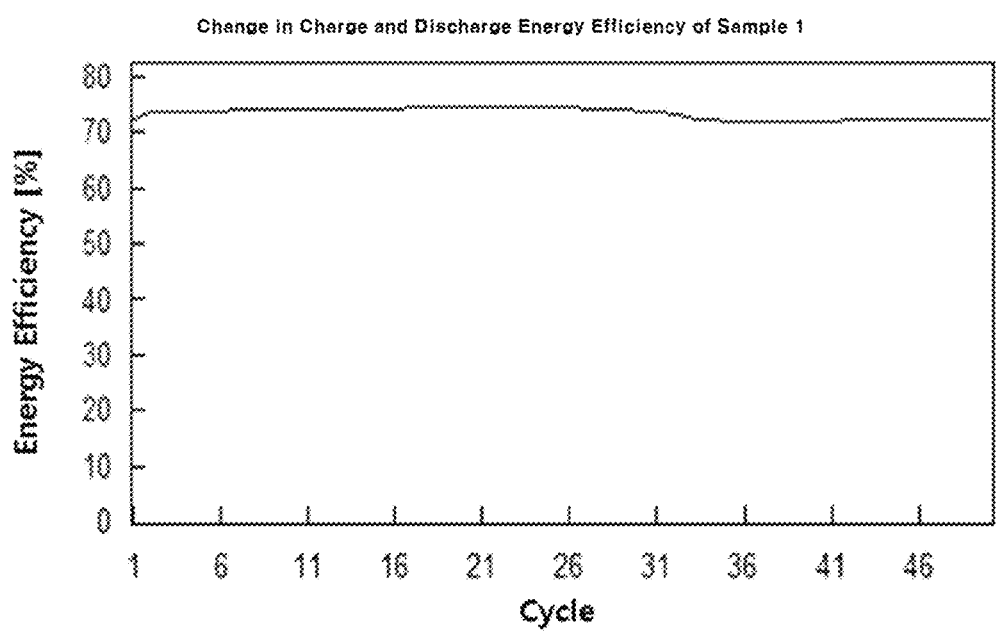
FIG. 15 is a graph showing charge and discharge energy efficiency of sample 1.
Figure 16:
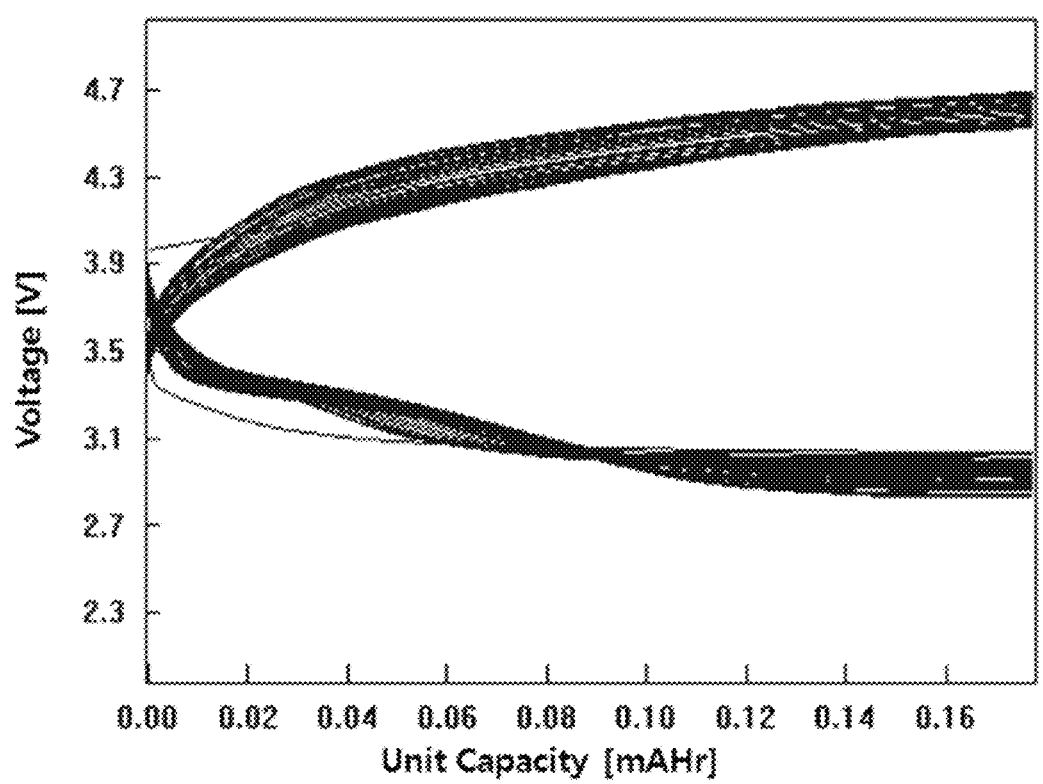
FIG. 16 is a graph showing a charge and discharge cycle of a lithium air battery (sample 2) including porous air-cathode to which both of Nafion membrane and the microporous polyolefin-based film are applied.
Figure 17:
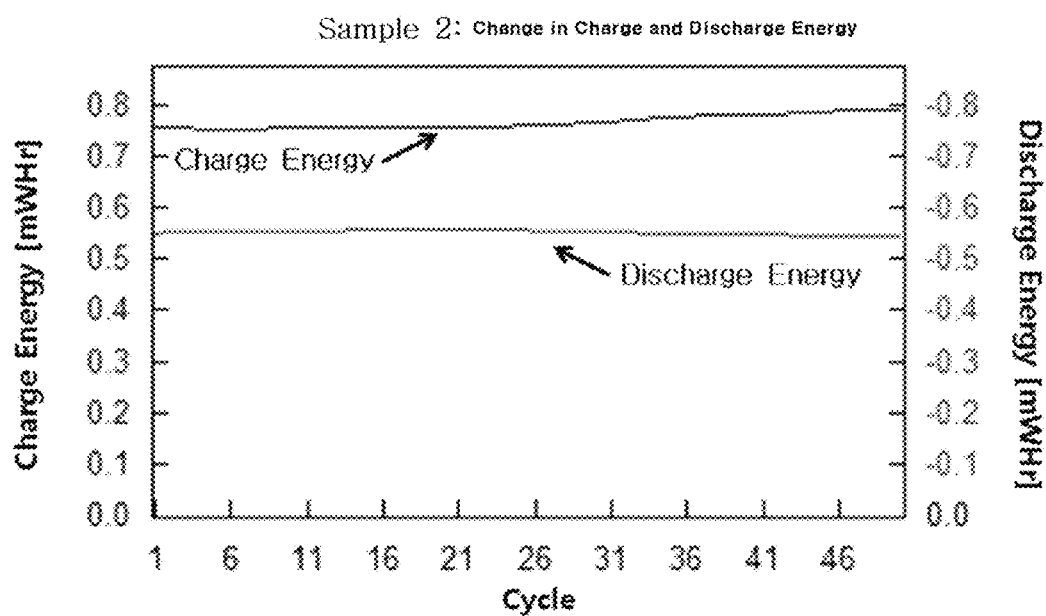
FIG. 17 is a graph showing charge and discharge energy of sample 2.
Figure 18:
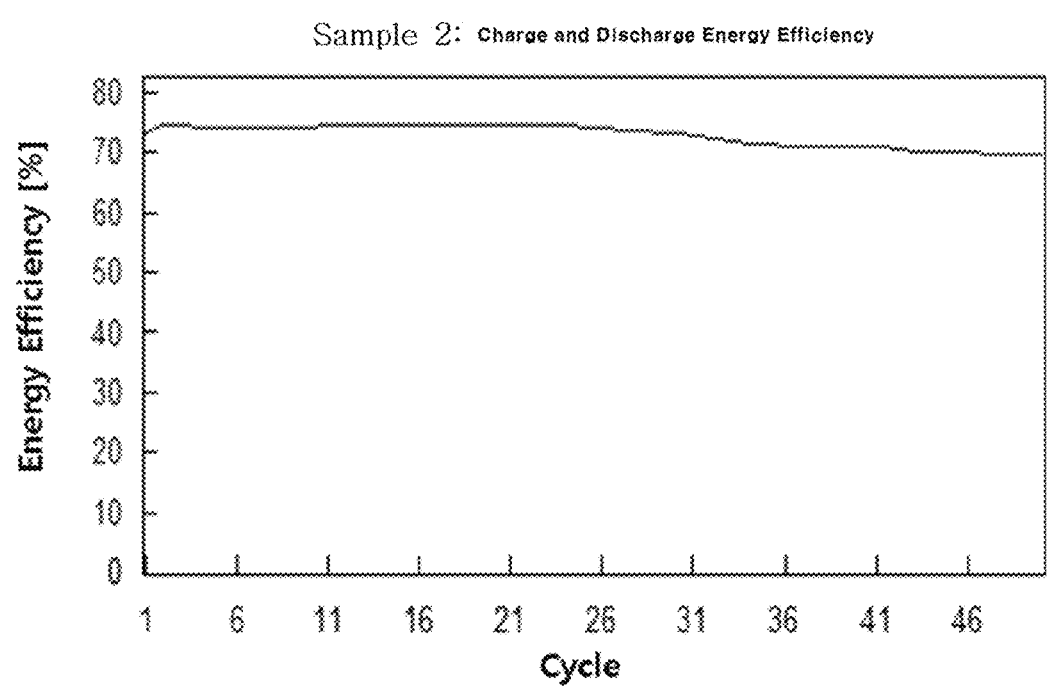
FIG. 18 is a graph showing charge and discharge energy efficiency of sample 2.

Example 2 was conducted for comparison between a case of suppressing evaporation of the water-based electrolyte using the microporous polyolefin-based film in Example 1 above and a case of not suppressing evaporation thereof. In addition, in order to clearly show the comparison, a microporous air-cathode to which Nafion film was not applied was used, and charge and discharge properties of the lithium air battery were evaluated by flowing 5 to 10 ccm of pure $O_2$ gas (relative humidity 0%) having moisture of 0.6 ppm or less rather than an ambient air, through ventilation holes 121 of the lithium air battery. Results obtained from the charge and discharge test were shown in FIGS. 11 and 12 and Table 4. Life span of the lithium air battery manufactured by applying the microporous polyolefin-based film to air-cathode was remarkably improved.

TABLE 4

| Unit Capacitance of Charge and Discharge | Cycle | Running Time | Microporous Polyolefin-based Film |
|---|---|---|---|
| 0.18 mAh | 7 | 7 (H):45 (M):43 (S) | Non-Applied |
| 0.18 mAh | 52 | 58 (H):55 (M):47 (S) | Applied |

Example 3

Figure 19:
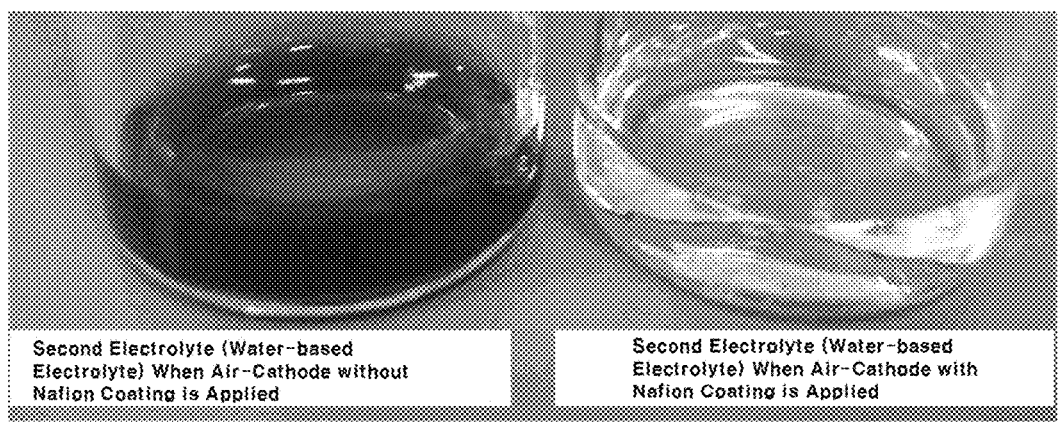
FIG. 19 is a photograph showing comparison of a discoloration degree between a water-based electrolyte in a lithium air battery including porous air-cathode without Nafion membrane and a water-based electrolyte in a lithium air battery including porous air-cathode with Nafion membrane, after tens of cycles.

A lithium air battery of Example 3 was manufactured by preparing air-cathode obtained by using N-117 Nafion membrane of Example 1 above, performing Nafion coating with hot pressing method of Preparation Example 1, and applying the microporous polyolefin-based film thereto. After the charge and discharge of two lithium air batteries (sample 1 and sample 2) were repeated 50 times, change in charge and discharge energy and efficiency of charge and discharge energy were shown in FIGS. 13 to 18, and discharge energy retention rate was shown in Tables 5 and 6. It could be appreciated that the air-cathode to which Nafion membrane was applied showed stable and excellent performance of the battery. In addition, as shown in FIG. 19, in a case of applying Nafion coating to the air-cathode, the platinum (Pt) catalyst layer was completely blocked from being slowly detached, such that after 50 cycle of the charge and discharge of the battery, discoloration of the second electrolyte (or the water-based electrolyte) due to the detached platinum (Pt) catalyst layer did not completely occur.

TABLE 5

Sample 1: Discharge Energy Retention Rate after 50 Cycles

| Discharge Energy [mWHr] | Cycle | Discharge Energy Retention Rate [%] |
|---|---|---|
| 0.54 | 1 | 103.7 |
| 0.56 | 50 | |

TABLE 6

Sample 2: Discharge Energy Retention Rate after 50 Cycles

| Discharge Energy [mWHr] | Cycle | Discharge Energy Retention Rate [%] |
|---|---|---|
| 0.55 | 1 | 98.1 |
| 0.54 | 50 | |

Example 4

Figure 20:
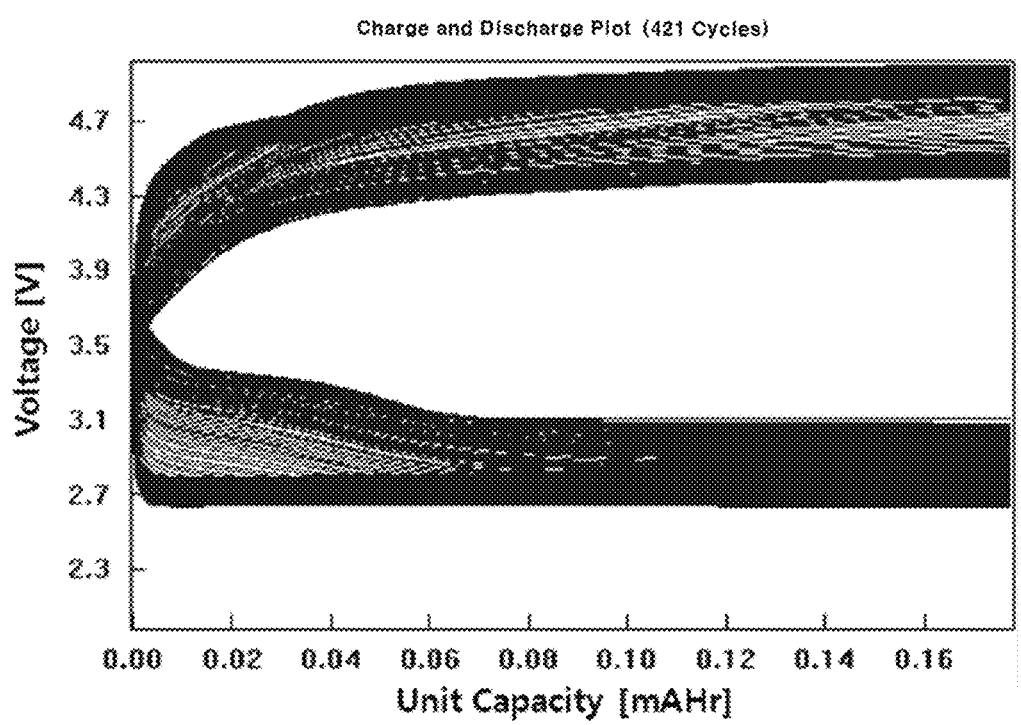
FIG. 20 is a graph showing the charge and discharge cycle at 421 times of a lithium air battery including porous air-cathode to which both of Nafion membrane and the microporous polyolefin-based film are applied.
Figure 21:
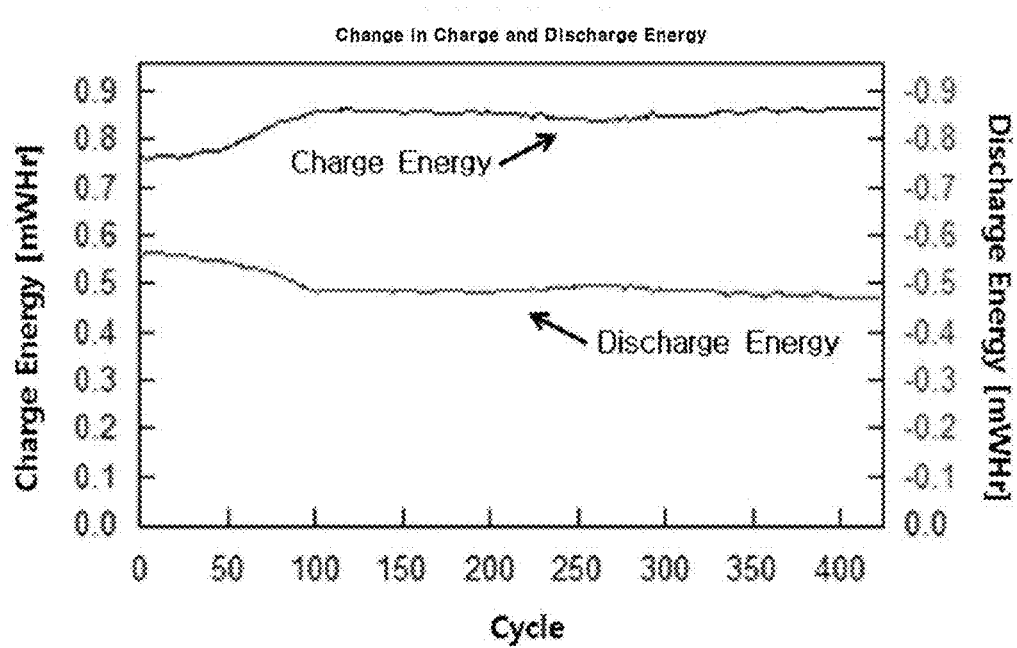
FIG. 21 is a graph showing charge and discharge energy of the lithium air battery of FIG. 20.
Figure 22:
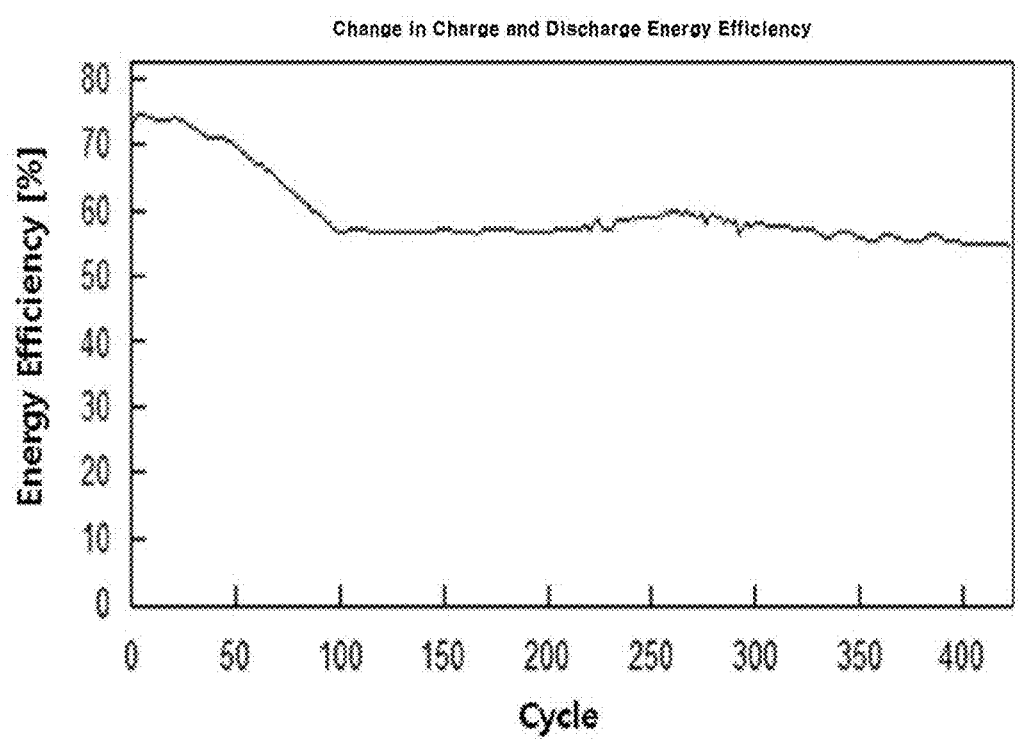
FIG. 22 is a graph showing charge and discharge energy efficiency of the lithium air battery of FIG. 20.

A lithium air battery of Example 4 was manufactured by preparing air-cathode obtained by performing Nafion coating with the dip coating method of Preparation Example 1 in Example 1, and applying the microporous polyolefin-based film thereto. After the charge and discharge of the lithium air battery was conducted 421 times, change in charge and discharge energy and efficiency of charge and discharge energy were shown in FIGS. 20 to 22, and a discharge energy retention rate after conducting 421 cycles was shown in the following Table 7. The battery applied by Nafion dip coating scheme had excellent battery performance, in particular, significantly excellent cycle life span.

TABLE 7

Discharge Energy Retention Rate after 421 Cycles

| Discharge Energy [mWHr] | Cycle | Discharge Energy Retention Rate [%] |
|---|---|---|
| 0.55 | 1 | 85.5 |
| 0.47 | 421 | |

It may be appreciated from the lithium air batteries according to Examples 1 to 4 of the present invention that the Nafion coating may prevent the platinum (Pt) catalyst layer from being slowly detached and the microporous polyolefin-based film may prevent the water-based electrolyte solvent from being evaporated, thereby significantly improving the performance of the battery. It may be appreciated that excellent life span cycle which is 421 cycles under an atmospheric condition may be secured, and discharge energy retention rate may also be significantly high.

In addition, in the case in which lithium metal is used as the anode, due to an effect of moisture, life span over several tens of cycles may not be secured in the existing lithium air battery. However, the lithium air battery according to the present invention may prevent an electric short circuit due to a structure thereof and basically obstruct infiltration of moisture, thereby securing excellent life span cycle.

Further, in a case of using an ionic liquid as a water-based electrolyte in the lithium air battery according to the present invention, in particular, using the ionic liquid having anions such as FSI or TFSI as the water-based electrolyte, deterioration due to decomposition reaction with lithium may be reduced, such that excellent charge and discharge properties may be provided. Here, even in a case of a general half-cell, at least 4 to 12 hours stabilization time is required, meanwhile, the lithium air battery according to the present invention has a short stabilization time of 30 minutes to 1 hour.

With the lithium air battery according to the present invention, the cathode contacting the electrolyte and using oxygen in the air as the active material is coupled to the hydrophobic microporous polyolefin-based film and the membrane through which the lithium ions pass, such that even though the charge and discharge of the battery is repeated, the catalyst layer may not be detached, but the water-based electrolyte solvent may be prevented from being evaporated, thereby preventing performance deterioration due to repetition of the charge and discharge of the lithium air battery, and extending life span.

The present invention is not limited to the above-mentioned embodiments but may be variously applied. In addition, it will be appreciated by those skilled in the art that various modifications and changes may be made without departing from the appended claims of the present invention.

What is claimed is:

1. A lithium air battery comprising:
a first electrode part including a lithium metal;
a second electrode part disposed spaced apart from the first electrode part, the second electrode part including a gas diffusion layer one side of which contacts an air, a single catalyst layer formed at an other side of the gas diffusion layer, the single catalyst layer being formed of a mixture of platinum, a binder, and optionally a conductive material, a porous membrane made of a polyperfluorosulfonic acid (PFSA) resin closely adhered to the single catalyst layer so that lithium ions pass therethrough, and a microporous polyolefin-based composite film formed on the one side of the gas diffusion layer, the microporous polyolefin-based composite film including a microporous polyolefin-based film and a coating layer formed on the microporous polyolefin-based film, the coating layer containing a water-soluble polymer binder, a water-non-soluble polymer binder and an inorganic particle; and
an electrolyte part provided between the first electrode part and the second electrode part,
wherein the electrolyte part includes a separator one side of which is closely adhered on the first electrode part and containing an organic-based electrolyte, a solid electrolyte closely adhered on an other side of the separator, and a water-based electrolyte provided between the solid electrolyte and the membrane,
wherein the microporous polyolefin-based composite film, the gas diffusion layer, the single catalyst layer, and the membrane are sequentially stacked, such that the microporous polyolefin-based composite film is disposed to contact an air and the membrane is disposed to contact the water-based electrolyte, and
wherein the single catalyst layer is directly contacted with the gas diffusion layer and the membrane.

2. The lithium air battery of claim 1, further comprising:
a housing part including a first housing provided with a space part having an open upper side, and a second housing having an air accommodation part disposed at an upper portion of the first housing, sealing the space part of the first housing, and having an open lower side, and ventilation holes formed therein to communicate with the air accommodation part,
wherein the first electrode part is accommodated into the space part of the first housing,
the second electrode part is coupled to a lower side of the air accommodation part of the second housing to be spaced apart from the first electrode part, and
the electrolyte part is provided in the space part of the first housing to be provided between the first electrode part and the second electrode part.

3. The lithium air battery of claim 2, wherein an accommodation body is provided on an upper side of the solid electrolyte and includes an accommodation hole vertically penetrating therethrough, and
the accommodation body is disposed so that the solid electrolyte, the separator, and the first electrode part are closely adhered to one another in the space part.

4. The lithium air battery of claim 2, wherein the housing part further includes a third housing interposed between the first housing and the second housing and having a fixing hole vertically penetrating therethrough so that the second electrode part is fixed to the fixing hole.

5. The lithium air battery of claim 1, wherein the porous membrane is closely adhered to the single catalyst layer by heating and pressing the PFSA resin or by a dip-coating method using a PFSA resin solution.

6. The lithium air battery of claim 1, wherein the gas diffusion layer comprises carbon paper.

* * * * *